Nov. 7, 1961  H. F. OLSON ET AL  3,007,362
COMBINATION RANDOM-PROBABILITY SYSTEM
Filed Oct. 5, 1954  17 Sheets-Sheet 2
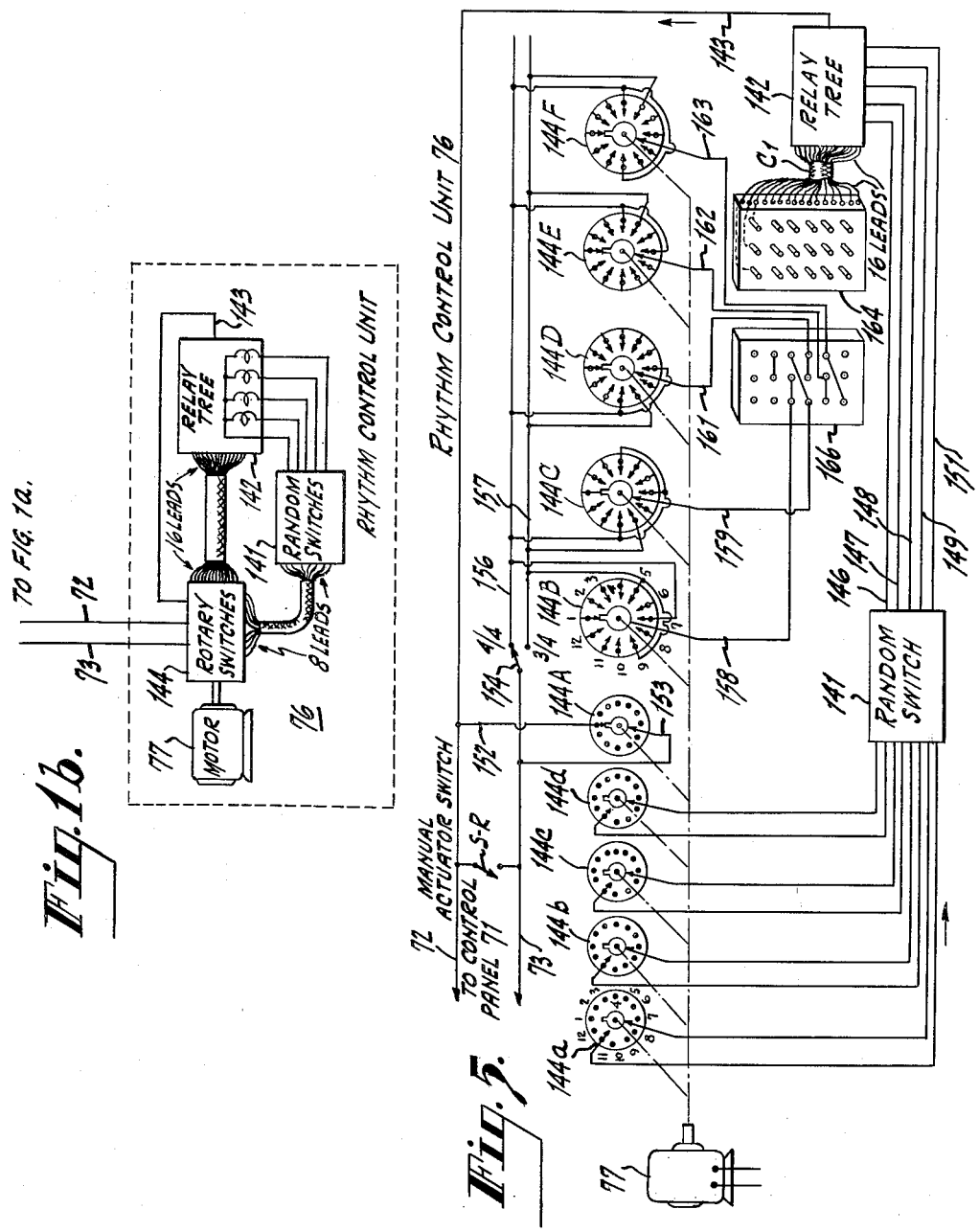
INVENTORS
HARRY F. OLSON &
HERBERT BELAR
BY Floyd M. Harris
ATTORNEY INVENTORS
HARRY F. OLSON AND
HERBERT BELAR
By Floyd M. Harris
ATTORNEY

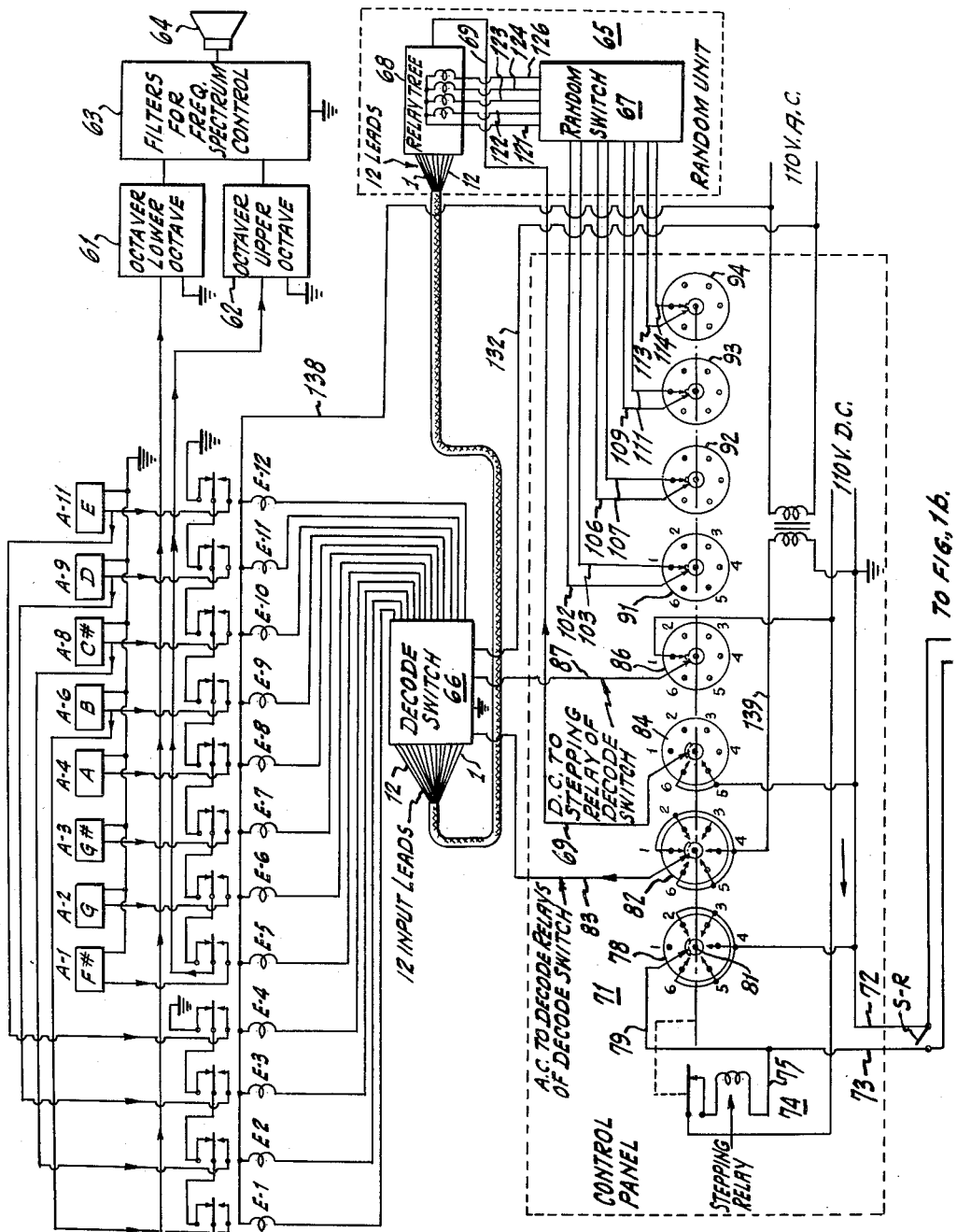

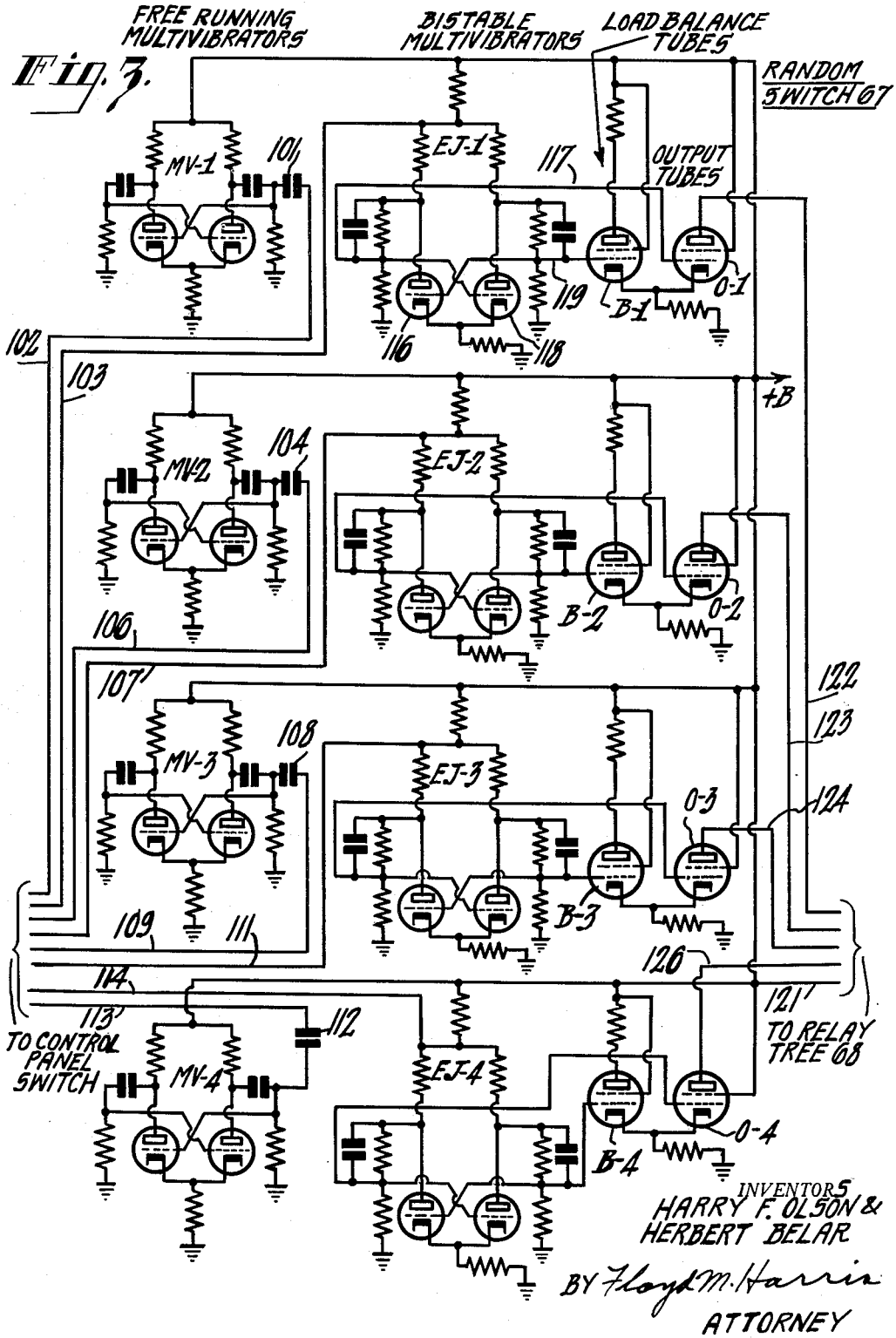

Nov. 7, 1961  H. F. OLSON ET AL  3,007,362
COMBINATION RANDOM-PROBABILITY SYSTEM
Filed Oct. 5, 1954  17 Sheets-Sheet 5
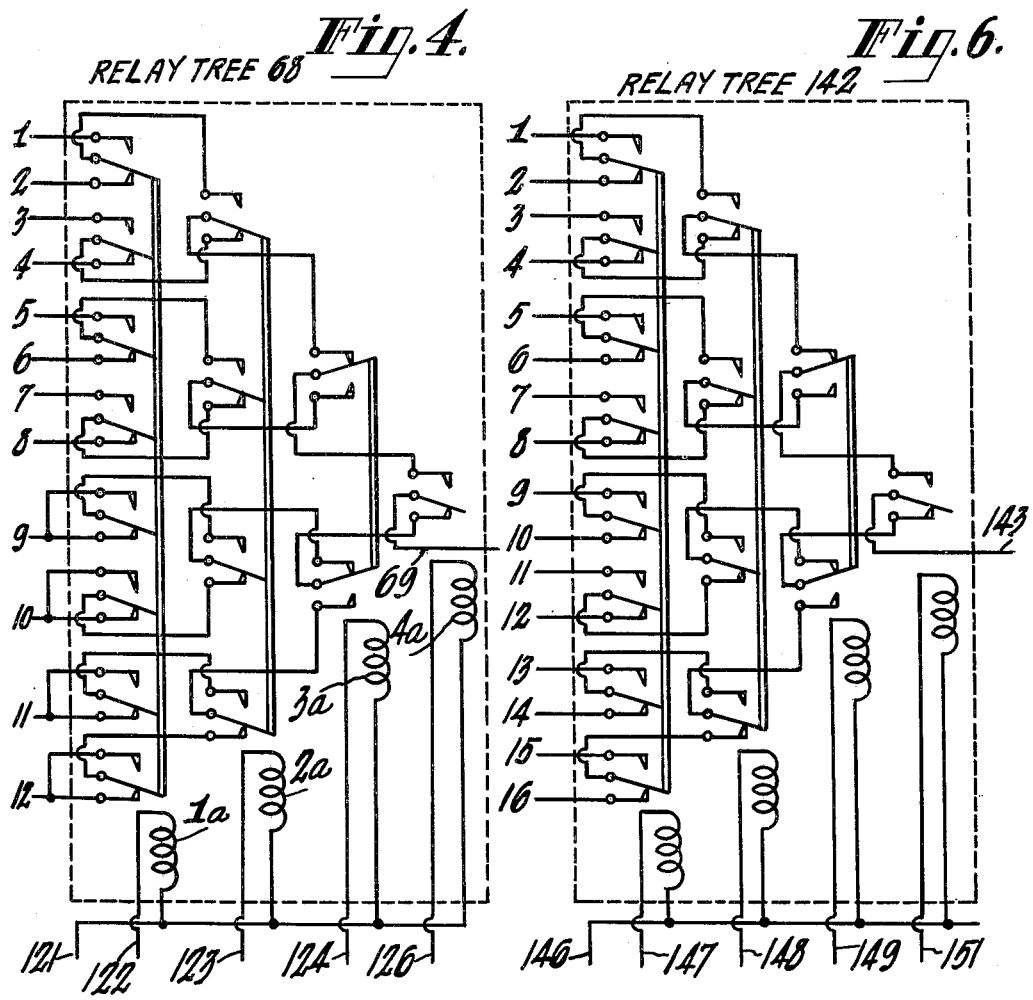
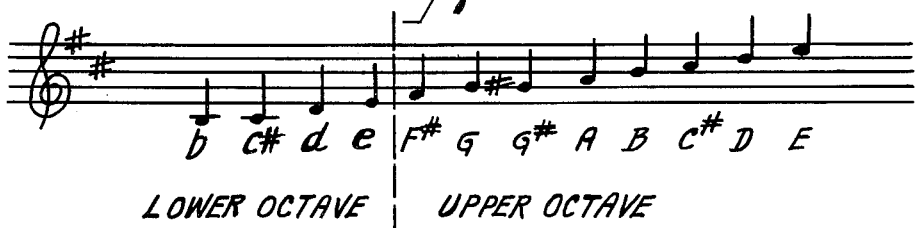
INVENTORS
HARRY F. OLSON &
BY HERBERT BELAR
Floyd M. Harris
ATTORNEY

Fig. 8.

DINOTE CODE

| Bus | Dinote | Bus | Dinote |
|---|---|---|---|
| 1 | d b | 26 | d A |
| 2 | d c# | 27 | e A |
| 3 | e c# | 28 | F# A |
| 4 | b d | 29 | G A |
| 5 | C# d | 30 | G# A |
| 6 | d d | 31 | A A |
| 7 | e d | 32 | B A |
| 8 | F# d | 33 | D A |
| 9 | A d | 34 | E A |
| 10 | B d | 35 | F# B |
| 11 | d e | 36 | G B |
| 12 | e e | 37 | A B |
| 13 | F# e | 38 | B B |
| 14 | d F# | 39 | C# B |
| 15 | e F# | 40 | D B |
| 16 | F# F# | 41 | d C# |
| 17 | G F# | 42 | D C# |
| 18 | A F# | 43 | E C# |
| 19 | B F# | 44 | d D |
| 20 | d G | 45 | e D |
| 21 | F# G | 46 | A D |
| 22 | G G | 47 | B D |
| 23 | A G | 48 | C# D |
| 24 | B G | 49 | D D |
| 25 | A G# | 50 | D E |

NOTE: CAP LETTER ONE OCTAVE HIGHER THAN LOWER CASE

INVENTORS
HARRY F. OLSON &
HERBERT BELAR

BY Floyd M. Harris
ATTORNEY

Nov. 7, 1961   H. F. OLSON ET AL   3,007,362
COMBINATION RANDOM-PROBABILITY SYSTEM
Filed Oct. 5, 1954   17 Sheets-Sheet 7

TRINOTES SHOWING
PROBABILITY OF NOTE FOLLOWING
A DINOTE EXPRESSED IN SIXTEENTH'S
11 S. FOSTER SONGS
ALL TRANSPOSED TO KEY OF D          PAGE 1

| BUS | DINOTE | b | c# | d | e | F# | G | G# | A | B | C# | D | E |
|---|---|---|---|---|---|---|---|---|---|---|---|---|---|
| 4 | b d | | | 16 | | | | | | | | | |
| 5 | c# d | | | 5 | 6 | | | | 5 | | | | |
| 1 | d b | | | 16 | | | | | | | | | |
| 2 | d c# | | | 16 | | | | | | | | | |
| 6 | d d | | 2 | 2 | 9 | 2 | 1 | | | | | | |
| 11 | d e | | | 3 | 4 | 8 | | | 1 | | | | |
| 14 | d F# | | | | 7 | 3 | 2 | | 4 | | | | |
| 20 | d G | | | | | 11 | | | | 5 | | | |
| 26 | d A | | | | | 4 | | | 12 | | | | |
| 41 | d C# | | | | | | | | | | | 16 | |
| 44 | d D | | | | | | | | 2 | 11 | 3 | | |
| 3 | e c# | | | 16 | | | | | | | | | |
| 7 | e d | 1 | | 1 | 4 | 5 | | | 1 | | 1 | 3 | |
| 12 | e e | | 1 | 12 | 1 | 2 | | | | | | | |
| 15 | e F# | | | 1 | 3 | 6 | 4 | | 1 | 1 | | | |
| 27 | e A | | | | | | | | 13 | 3 | | | |
| 45 | e D | | | | | | | | | | 16 | | |
| 8 | F# d | | | | 12 | 3 | 1 | | | | | | |
| 13 | F# e | | 2 | 7 | 3 | 2 | | | 1 | | | 1 | |
| 16 | F# F# | | | 3 | 4 | 6 | 2 | | 1 | | | | |
| 21 | F# G | | | | | 4 | 3 | | 6 | 3 | | | |
| 28 | F# A | | | | | 2 | | | 10 | 3 | | 1 | |
| 35 | F# B | | | | | | | | 16 | | | | |
| 17 | G F# | | | | 8 | | 8 | | | | | | |

Fig. 9a.

INVENTORS
HARRY F. OLSON AND
BY HERBERT BELAR
ATTORNEY

Nov. 7, 1961  H. F. OLSON ET AL  3,007,362
COMBINATION RANDOM-PROBABILITY SYSTEM
Filed Oct. 5, 1954  17 Sheets—Sheet 8

*Fig. 9b.*  TRINOTES  PAGE 2

| BUS | DINOTE | b | C# | d | e | F# | G | G# | A | B | C# | D | E |
|---|---|---|---|---|---|---|---|---|---|---|---|---|---|
| 22 | G G | | | | | | 8 | | 8 | | | | |
| 29 | G A | | | 2 | | | | | 10 | | | 4 | |
| 36 | G B | | | | | | | | 16 | | | | |
| 30 | G#A | | | | | | | | | 16 | | | |
| 9 | A d | | | | 11 | 5 | | | | | | | |
| 18 | A F# | | | 5 | 4 | 3 | 1 | | 2 | 1 | | | |
| 23 | A G | | | | | 16 | | | | | | | |
| 25 | A G# | | | | | | | | 16 | | | | |
| 31 | A A | | | | | 4 | 1 | 1 | 5 | 5 | | | |
| 37 | A B | | | 1 | | 1 | | | 12 | 1 | | 1 | |
| 46 | A D | | | | | | | | 6 | 5 | 3 | 2 | |
| 10 | B d | | | 16 | | | | | | | | | |
| 19 | B F# | | | | 11 | 5 | | | | | | | |
| 24 | B G | | | | | | | | | 16 | | | |
| 32 | B A | | | 1 | | 9 | 1 | | 2 | 1 | | 2 | |
| 38 | B B | | | | | 2 | | | 12 | | | 2 | |
| 47 | B D | | | | | | | | 9 | 2 | 5 | | |
| 39 | C#B | | | | | | | | 16 | | | | |
| 48 | C#D | | | | | | | | | 6 | | | 10 |
| 33 | D A | | | | | 14 | | | 2 | | | | |
| 40 | D B | | | | | | 1 | | 5 | 6 | | 4 | |
| 42 | D C# | | | | | | | | | 12 | | 4 | |
| 49 | D D | | | | | | | | | 16 | | | |
| 50 | D E | | | | | | | | 5 | | 11 | | |
| 34 | E A | | | | | | | | 16 | | | | |
| 43 | E C# | | | | | | | | | | | 16 | |

RHYTHM CONTROL TABULATION

| WAFER | 4/4 | 3/4 | PROBABILITY |
|---|---|---|---|
| 144B | ♩ ♩ | ♩ ♩ ♩ | 4/16 |
| 144C | ♩ ♩ ♩ ♩ | ♩ ♩ | 2/16 |
| 144D | ♩ ♩ ♩ | ♩ ♩ | 2/16 |
| 144E | ♩ ♩ ♩ | ♩ ♩ | 2/16 |
| 144F | ♩ ♩ ♩ | ♩ ♩ | 2/16 |

*Fig. 10.*

INVENTORS
HARRY F. OLSON AND
BY HERBERT BELAR

Floyd M. Harris
ATTORNEY

Fig. 12.

TWO NOTE SEQUENCES OF 11 STEPHEN FOSTER SONGS

PROBABILITY OF A NOTE FOLLOWING THE PRECEDING NOTE EXPRESSED IN $\frac{1}{16}$

| | PROBABILITY OF FOLLOWING NOTE | | | | | | | | | | | |
|---|---|---|---|---|---|---|---|---|---|---|---|---|
| | b | c# | d | e | F# | G | G# | A | B | C# | D | E |
| b  |   |   | 16 |   |   |   |   |   |   |   |   |   |
| c# |   |   | 16 |   |   |   |   |   |   |   |   |   |
| d  | 1 | 1 | 2  | 5 | 3 | 1 |   | 1 |   | 1 | 1 |   |
| e  |   | 1 | 6  | 3 | 4 |   |   | 1 |   |   | 1 |   |
| F# |   |   | 2  | 4 | 5 | 2 |   | 2 | 1 |   |   |   |
| G  |   |   |    |   | 4 | 3 |   | 6 | 3 |   |   |   |
| G# |   |   |    |   |   |   |   | 16|   |   |   |   |
| A  |   |   | 1  |   | 5 | 1 | 1 | 4 | 3 |   | 1 |   |
| B  |   |   | 1  |   | 1 | 1 |   | 9 | 2 |   | 2 |   |
| C# |   |   |    |   |   |   |   |   | 8 |   | 8 |   |
| D  |   |   |    |   |   |   |   | 4 | 7 | 3 | 1 | 1 |
| E  |   |   |    |   |   |   |   | 6 |   | 10|   |   | b, c#, d, e, LOWER OCTAVE
F#, G, G#, A, B, C#, D, E, UPPER OCTAVE
ALL SONGS TRANSPOSED TO "D"

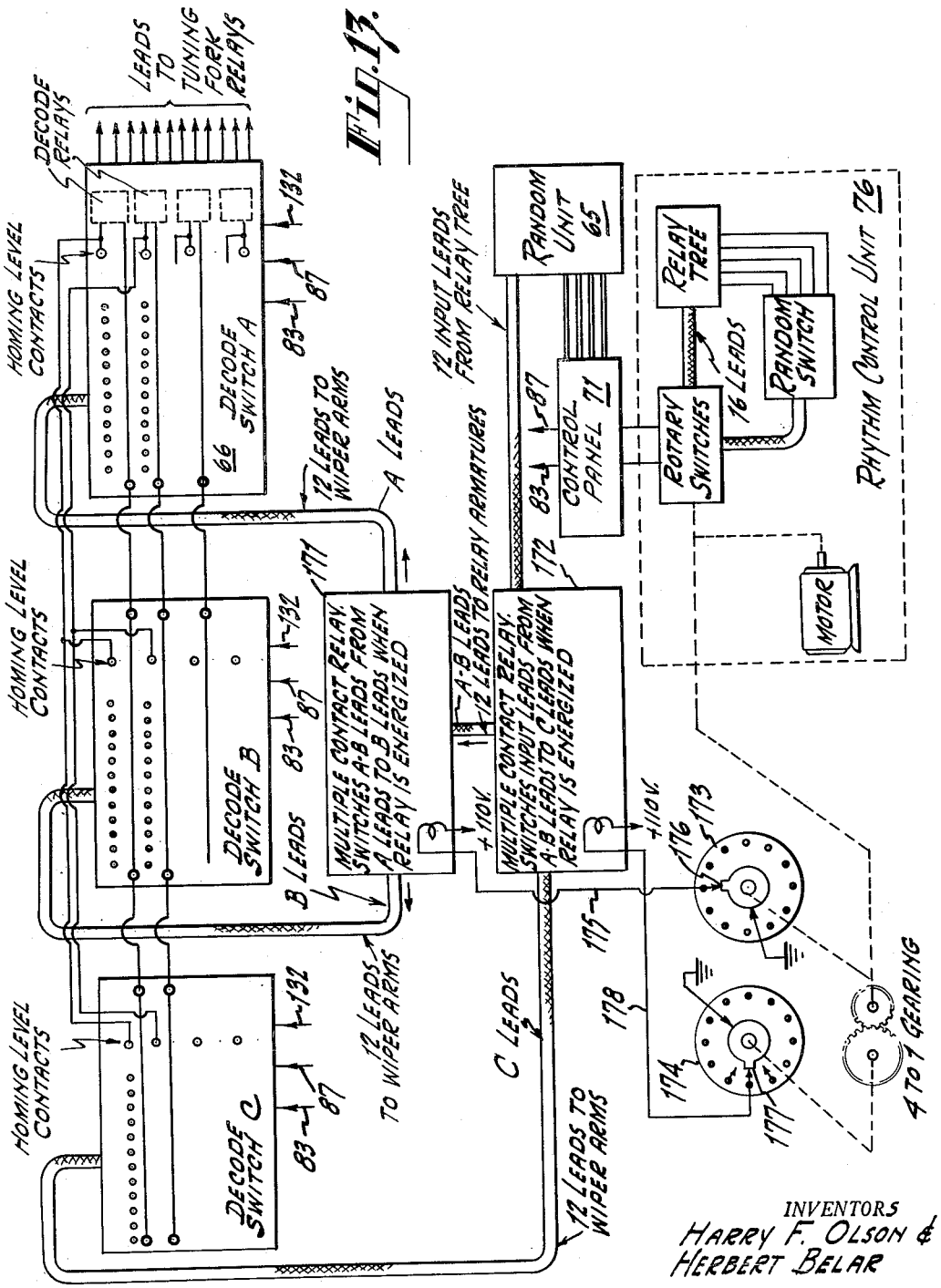

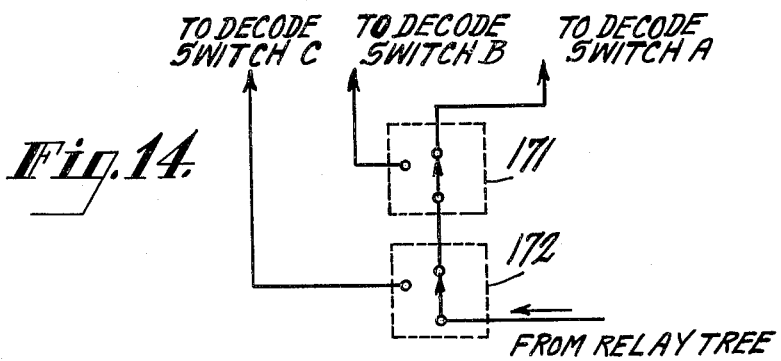
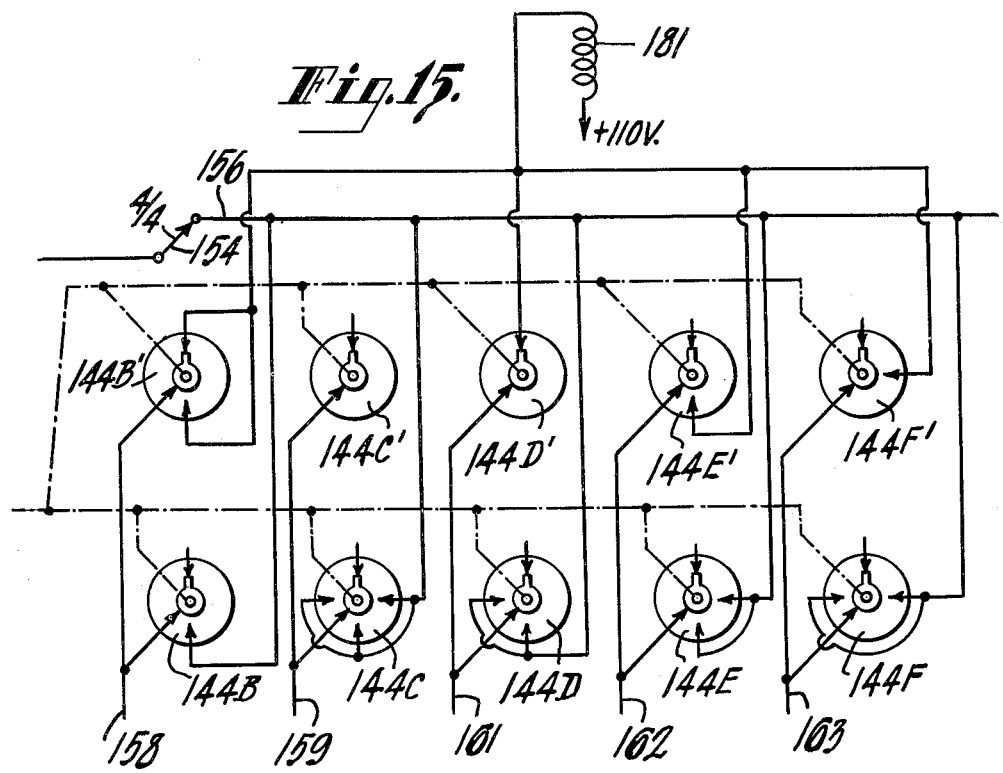

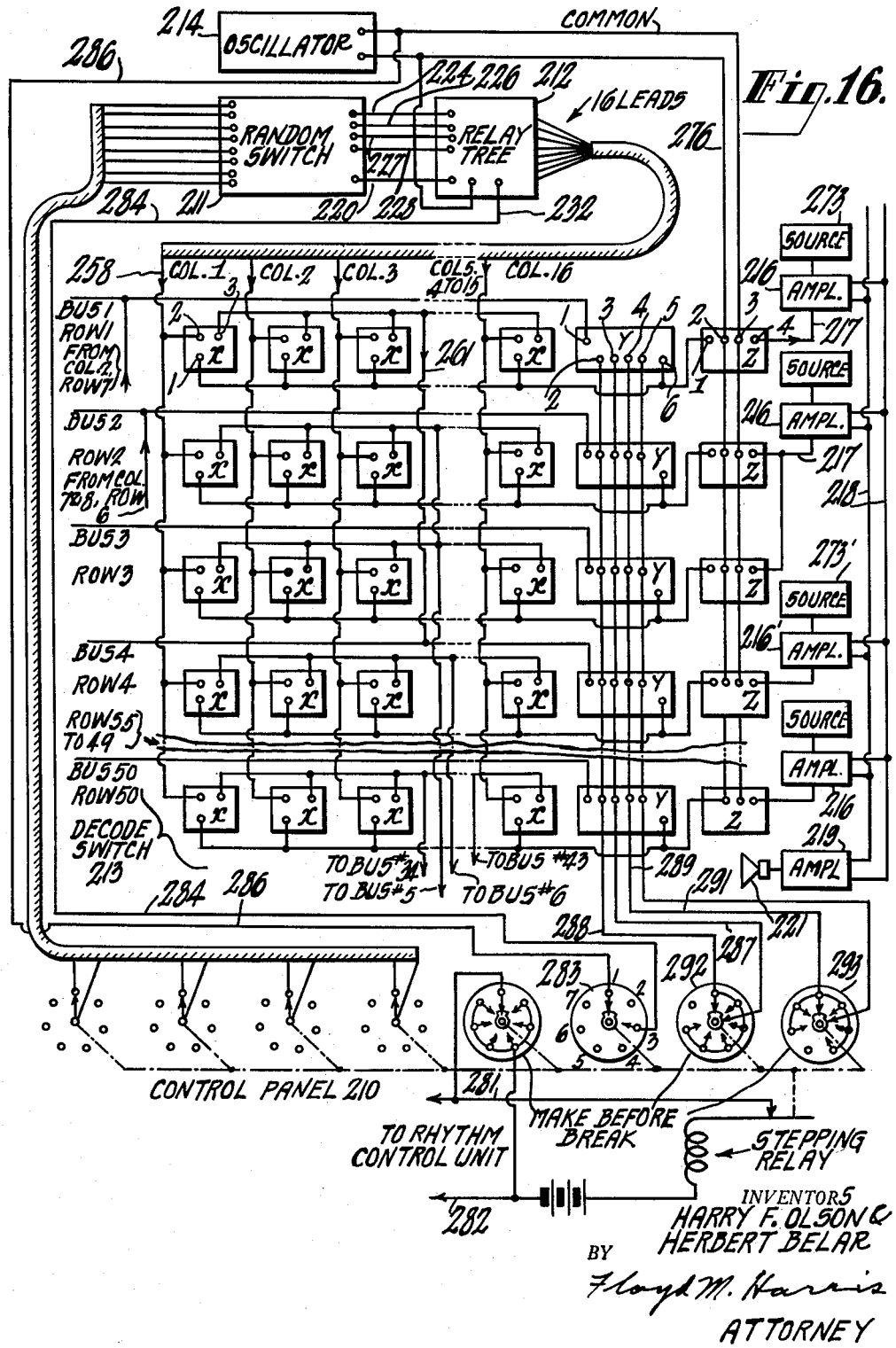

Nov. 7, 1961  H. F. OLSON ET AL  3,007,362
COMBINATION RANDOM-PROBABILITY SYSTEM
Filed Oct. 5, 1954  17 Sheets-Sheet 15

INVENTORS
HARRY F. OLSON &
HERBERT BELAR
BY Floyd M. Harris
ATTORNEY

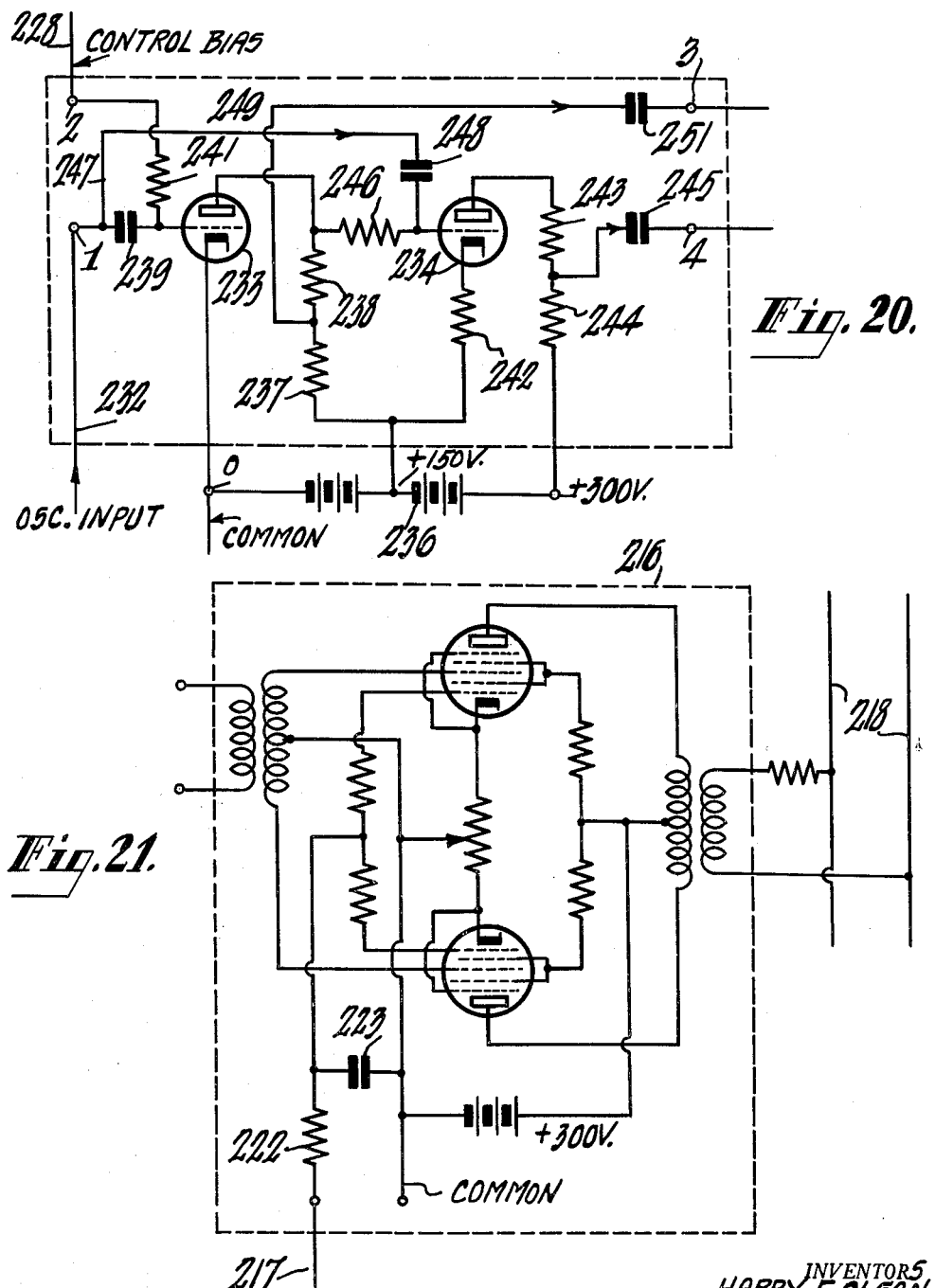

United States Patent Office 3,007,362
Patented Nov. 7, 1961

3,007,362
COMBINATION RANDOM-PROBABILITY SYSTEM
Harry F. Olson, Princeton, and Herbert Belar, Palmyra, N.J., assignors to Radio Corporation of America, a corporation of Delaware
Filed Oct. 5, 1954, Ser. No. 460,396
37 Claims. (Cl. 84—1.03)

Our invention relates to methods and apparatus which automatically supply information to create events following each other in sequence, particularly such special cases of sequences of events, where the probability of any type event occurring depends upon the kind of event or events that preceded. An event may be a musical tone, a pattern, a value, a number or an item of information, as will be described hereinafter. Such methods and apparatus represent a much higher order of organization than methods and apparatus for producing a series of random numbers as would a roulette wheel, for instance. While some processes in nature probably are purely random, there are more that are not in that what has taken place before is known to affect the future probability. The patter of rain may be random but the probability of raining is affected by the preceding weather. The specific example of the invention hereinafter described is a music composing machine and a method of composing music. Further, the specific example of said machine is designed to compose a sequence of successive notes of the same statistical character as employed in the compositions of Stephen Foster.

It will aid in understanding the present invention to note that there are commonly in use two methods or types of apparatus in the mathematical, computing or calculating field. The most common method is represented by a computing machine which gives one specific correct answer when certain values are set into it. The second method is represented by the method or apparatus that utilizes probabilities but still provides a single answer which is the best answer based on the probabilities. For example, in fire control, based on past performance and other factors it can be calculated what is the most likely position of a target. As another example, in operations research the probability of various events occurring form the basis of devising the best strategy. Similarly, in the theory of games, probabilities are utilized to obtain a single best answer.

The present invention is a third method and type of apparatus that differs from the two above described in that the method and apparatus are not designed to give only one possible answer in response to the information supplied. Instead, any one of several possibly suitable answers is given or selected. Which one of these suitable answers is selected depends upon a random selection weighed by the probability, based on preceding events, that a particular answer will be selected.

The present invention is particularly suitable for composing music since music composition follows certain general rules and patterns, and since there are many possible good answers. The invention, however, is not limited to this particular use.

In practicing the invention it is first determined, estimated, or arbitrarily decided, what the probabilities are that certain events, such as the sounding of certain musical notes, will follow a preceding event as, for example, the sounding of certain specific notes in succession. The notes are derived from sources thereof. The term "sources" as used herein is intended broadly to define any means which manifests or initiates the manifestation of any event, such for example, as a voltage output on a specified conductor. In general, there will be a different probability for each of said certain events. For example, for certain kinds of music it may be that the note sequence ab may be followed by either note a, note b, or note c. There will be a certain probability that note a will follow the sequence ab (such as the probability of three chances in sixteen). Likewise, there will be certain probabilities that the note b will follow ab, and that the note c will follow ab.

After these probabilities have been determined, the selection of one of said certain events (such as the selection of note a, note b, or note c) following the preceding event (sounding of ab in this example) is made at random and as a function of said probabilities.

The probabilities may be stored in a matrix. A matrix is an electrical component including circuits or elements in some ordered arrangement. The arrangement may be ordered in accordance with the probabilities. The selection or choice of events may be accomplished at random as a function of the probabilities stored or established in the matrix.

In two specific examples of the invention described hereinafter as applied to music composition, the probabilities are determined by a statistical study of Stephen Foster music. The resulting music produced by the composing machine, while new, sounds like Stephen Foster type music.

In practicing one embodiment of the invention, a switch with multiple settings or positions, referred to as the decode switch, is employed in combination with a random selection device. The above-mentioned probabilities are wired into the decode switch so that, following the selection of notes ab (continuing the above example and assuming two preceding cycles of operation), the apparatus will next select either a, b, or c. The decode switch provides a matrix of the type referred to above in which the probabilities are stored or established by means of the wiring or connections among the settings or positions of the switch. The decode switch will then go to the switch setting corresponding to said next selected note. The cycle is then repeated and it may be repeated indefinitely to select one note after another. Whether said next selected note is note a, note b, or note c depends upon the probability wiring and upon a random selection by the random selection device. In general, it may be stated that when the present invention is employed, the selection of any one event may appear to have been made at random, but on a long time average will be found to have been made in accordance with the probability of said selection.

An object of the invention is to provide an improved method of and means for selecting an event with a predetermined probability that it will follow a certain group of events or sequence of events that preceded it. The term "group of events" as used herein and in the claims includes the special case where the "group of events" consists of a single event.

A further object of the invention is to provide an improved method of and means for producing or indicating an event with a predetermined probability that it will follow a certain group of events that preceded it.

A further object of the invention is to provide a method of and means for selecting an event at random and also as a function of a probability that said event will follow a preceding group of events.

A further object of the invention is to provide a method of and means for utilizing statistical data for producing solutions based upon probabilities and random selection.

A further object of the invention is to provide an improved method of and means for composing music.

A further object of the invention is to provide an improved method of and means for composing music having a certain resemblance to a selected type of music.

A still further object of the invention is to provide an improved method of and means for producing or indicating a sequence of successive notes of the same statistical character as employed in musical compositions of a selected type.

A still further object of the invention is to provide an improved music composing machine.

A still further object of the invention is to provide an improved method of and means for providing a random selection.

A still further object of the invention is to provide an improved random selection device.

A still further object of the invention is to provide an improved means for repeatedly making circuit connections at random.

A still further object of the invention is to provide an improved method of and means for providing rhythm.

A still further object of the invention is to provide an improved means for producing different rhythmic patterns in music.

A still further object of the invention is to provide an improved vacuum tube relay tree.

The invention can be better understood by referring to the specific examples illustrated in the drawings in which:

FIGURES 1a and 1b together comprise a block and circuit diagram of one specific example of the invention, the example being a music composing machine;

FIGURE 3 is a circuit diagram of the random switches shown in FIGURE 1;

FIGURE 4 is a schematic diagram of the relay tree connecting into the decode switch shown in FIGURE 1;

FIGURE 5 is a schematic diagram of the rhythm control unit shown in FIGURE 1;

FIGURE 6 is a schematic diagram of the relay tree incorporated in the rhythm control unit shown in FIGURES 1 and 5;

FIGURE 7 is a staff showing the twelve notes used in the example of the invention herein described;

FIGURE 8 is a dinote code table that is referred to in explaining one specific example of the invention;

Figure 11:
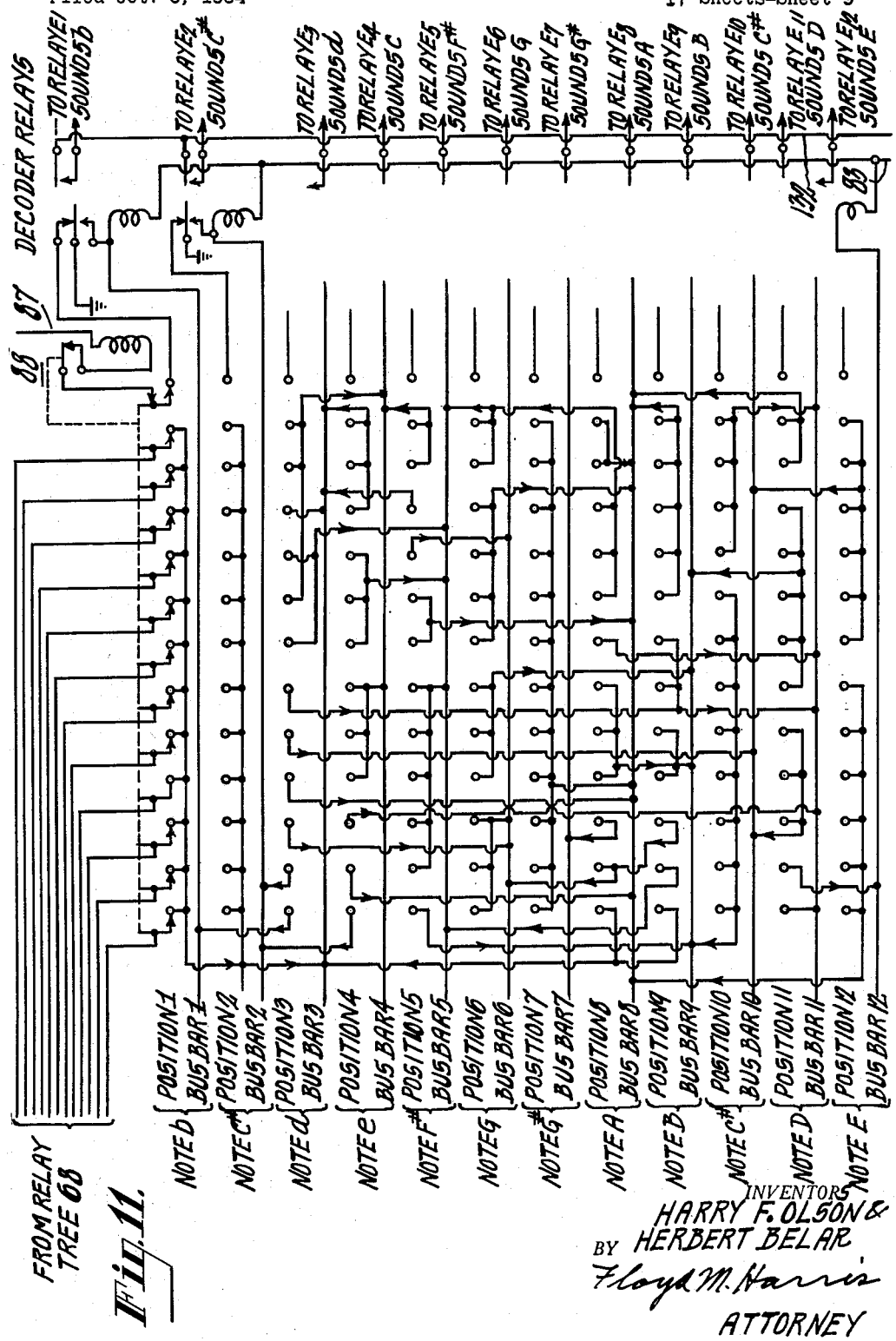
Figure 17:
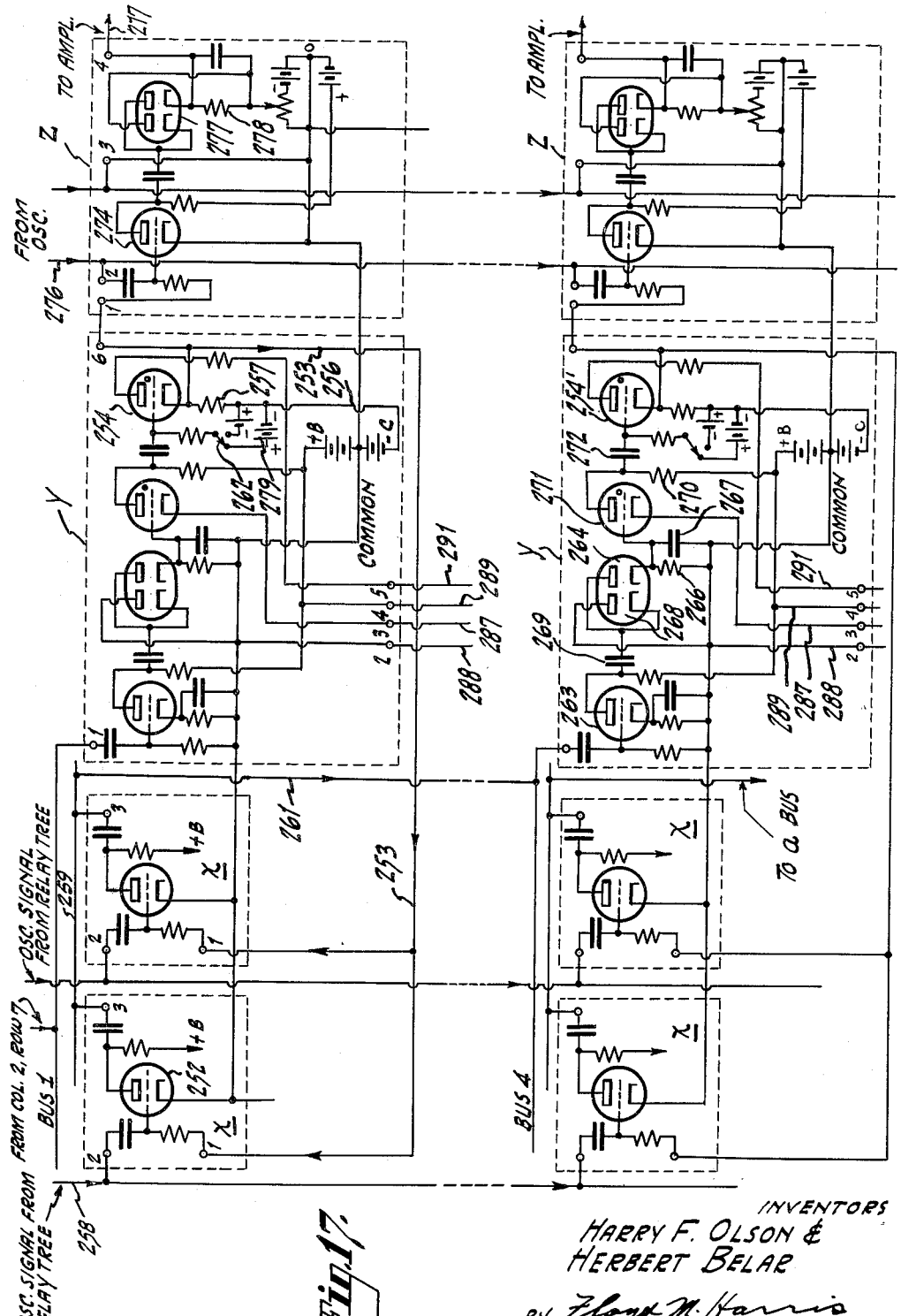
Figure 18:
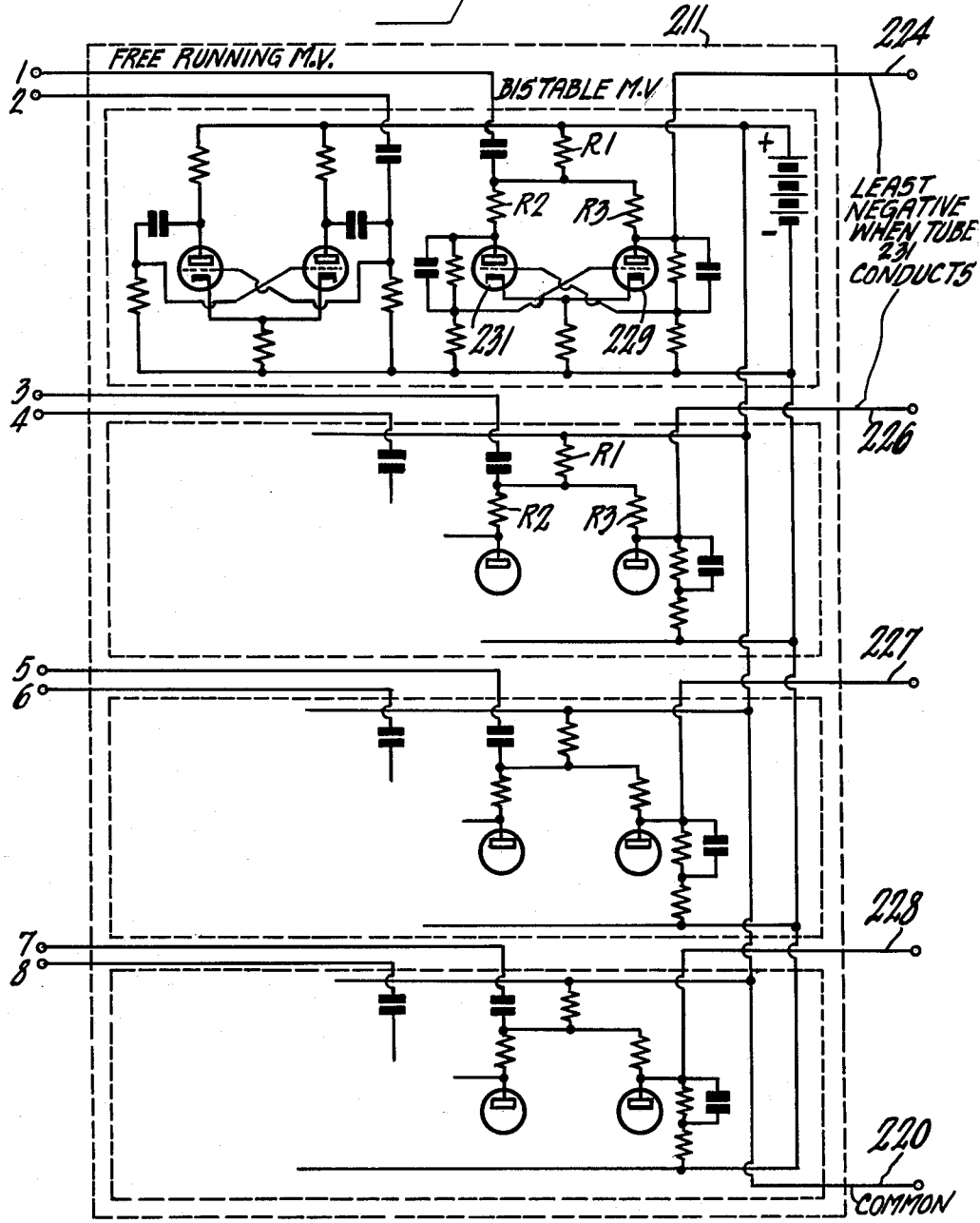
Figure 19:
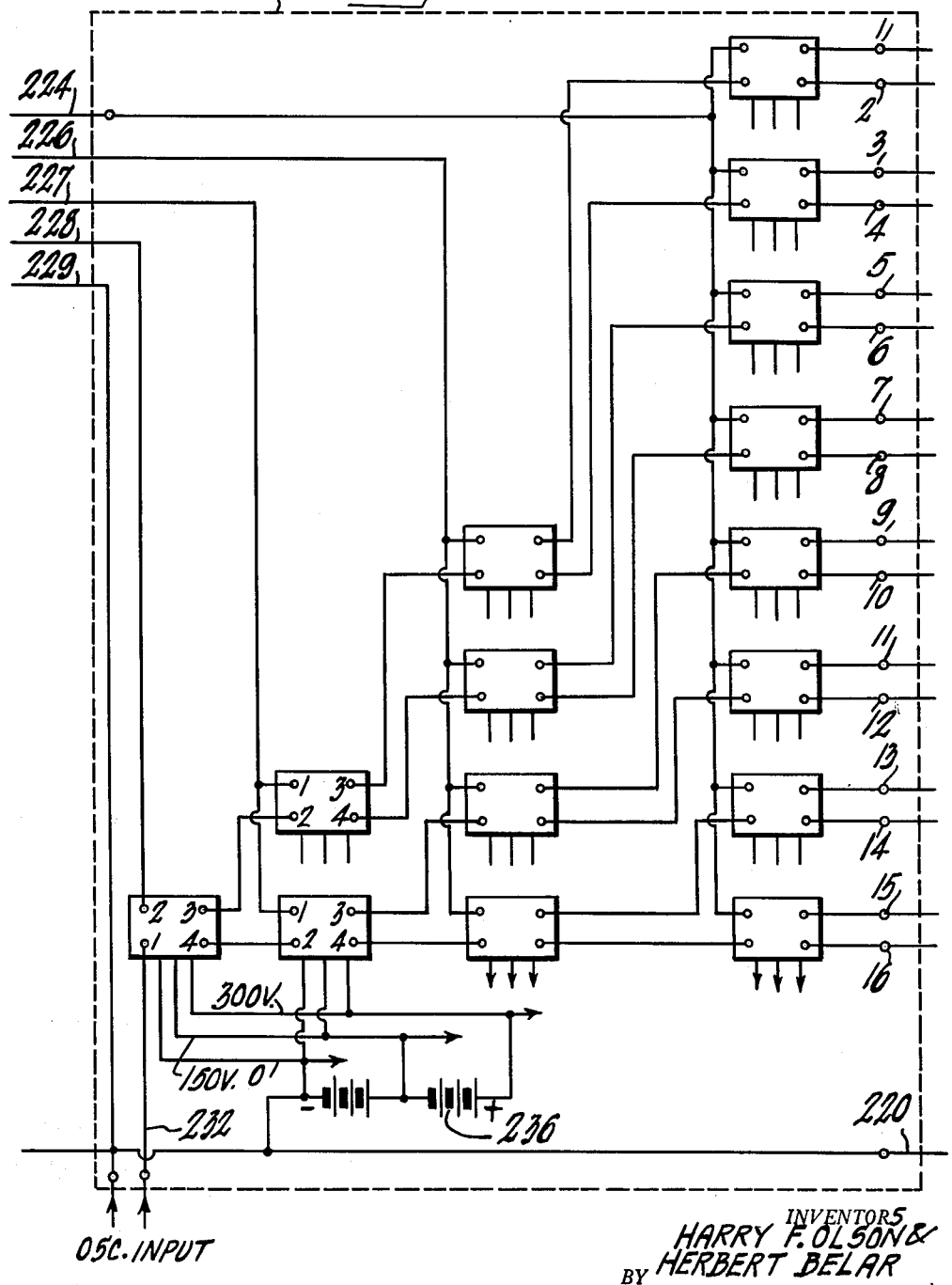

FIGURES 9a and 9b comprise a trinote probability table that is referred to in explaining one specific example of the invention;

FIGURE 10 is a tabulation showing how the rhythm control unit of FIGURE 5 functions;

FIGURE 11 is a schematic diagram of a decode switch wired according to the probabilities for a dinote sequence;

FIGURE 12 is a dinote probability table from which the decode switch of FIGURE 11 was wired;

FIGURE 13 is a block and circuit diagram showing an embodiment of the invention employing a plurality of decode switches;

FIGURE 14 is a schematic diagram that is referred to in explaining the circuit of FIGURE 13;

FIGURE 15 is a schematic diagram showing a portion of the switching circuit for another embodiment of the invention employing a plurality of decode switches;

FIGURE 16 is a block and circuit diagram of an embodiment of the invention employing a decode switch that utilizes electronic switching;

FIGURE 17 is a circuit diagram of certain units in the decode switch employed in the system of FIGURE 16;

FIGURE 18 is a block and circuit diagram of the random switch employed in the system of FIGURE 16;

FIGURE 19 is a block diagram of the vacuum tube relay tree employed in the system of FIGURE 16;

FIGURE 20 is a circuit diagram of the apparatus contained in each block of FIGURE 19; and FIGURE 21 is a circuit diagram of an amplifier employed in the system of FIGURE 16.

In the several figures similar parts are indicated by similar reference characters.

Let us consider the example of the invention wherein the system of FIGURES 1a and 1b is to compose music that will sound similar to Stephen Foster music but, at the same time, will be original music. An analysis of a group of Stephen Foster melodies, including "My Old Kentucky Home," "Old Folks at Home," and several others shows that there is a certain probability that a certain group of three notes (a trinote) will occur; that is, that a note following the two preceding ones (a dinote) has a certain probability of occurring depending upon the particular preceding dinote. This will be discussed more fully hereinafter. For the present, it is sufficient to note that the system of FIGURES 1a and 1b will play a sequence of notes in accordance with these probabilities, resulting in Stephen Foster type music.

Merely a sequence of notes is not sufficient for acceptable music; rhythm must be provided. This is provided by the rhythm control unit shown in FIGURE 1b, but the addition of rhythm need not be discussed until the note sequence selection has been described.

GENERAL SYSTEM DESCRIPTION

Before going into any detailed description, a brief general description of the complete system shown in FIGURE 1a will be given.

The signal frequency sources for providing the different musical notes may be tuning forks indicated by the blocks A-1, A-2, A-3, A-4, A-6, A-8, A-9, and A-11 which supply the notes indicated on the blocks, beginning with F sharp. An inspection of Stephen Foster melodies indicates that twelve notes are suitable. As illustrated, the composing machine can play in the key of A major or D major.

To avoid duplication of tuning forks, two octavers 61 and 62 are provided so that a fork tone may be sounded an octave higher when passed through octaver 62 than when passed through octaver 61.

Each octaver may comprise a clipping circuit, a frequency divider such as a multivibrator, and a shaping circuit that produces sawtooth waves. Thus the sine waves from the tuning forks are squared, divided in frequency, and converted to sawtooth waves having the desired harmonic content. The multivibrator in octaver 61 may divide by four, and the multivibrator in octaver 62 may divide by two.

The outputs of the octavers may be fed into filters 63 for frequency spectrum control so that the successive tones as heard from a loud speaker 64 will have the desired quality. As a matter of convenience, a separate filter for each octaver may be provided, and the outputs of the filters combined.

The tone or note called for by the composing machine is sounded in response to the energizing of one of the relays identified as relays E-1 to E-12. Each relay includes an armature, shown above the relay coil, having associated with it an upper contact and a lower contact. Energizing relay E-1, for example, connects tuning fork A-6 to octaver 61 to sound the note b (lower octave). Energizing relay E-10, for example, connects tuning fork A-8 to octaver 62 to sound the note C# (upper octaver). The upper contacts for relays E-4 and E-12, respectively, are grounded so that hum or noise cannot activate an octaver when a tuning fork is not connected to it. It will be noted, for example, that the lead going into octaver 61 is grounded by connection through the armatures of relays E-1 to E-4 until one of these relays is energized.

Figure 2:
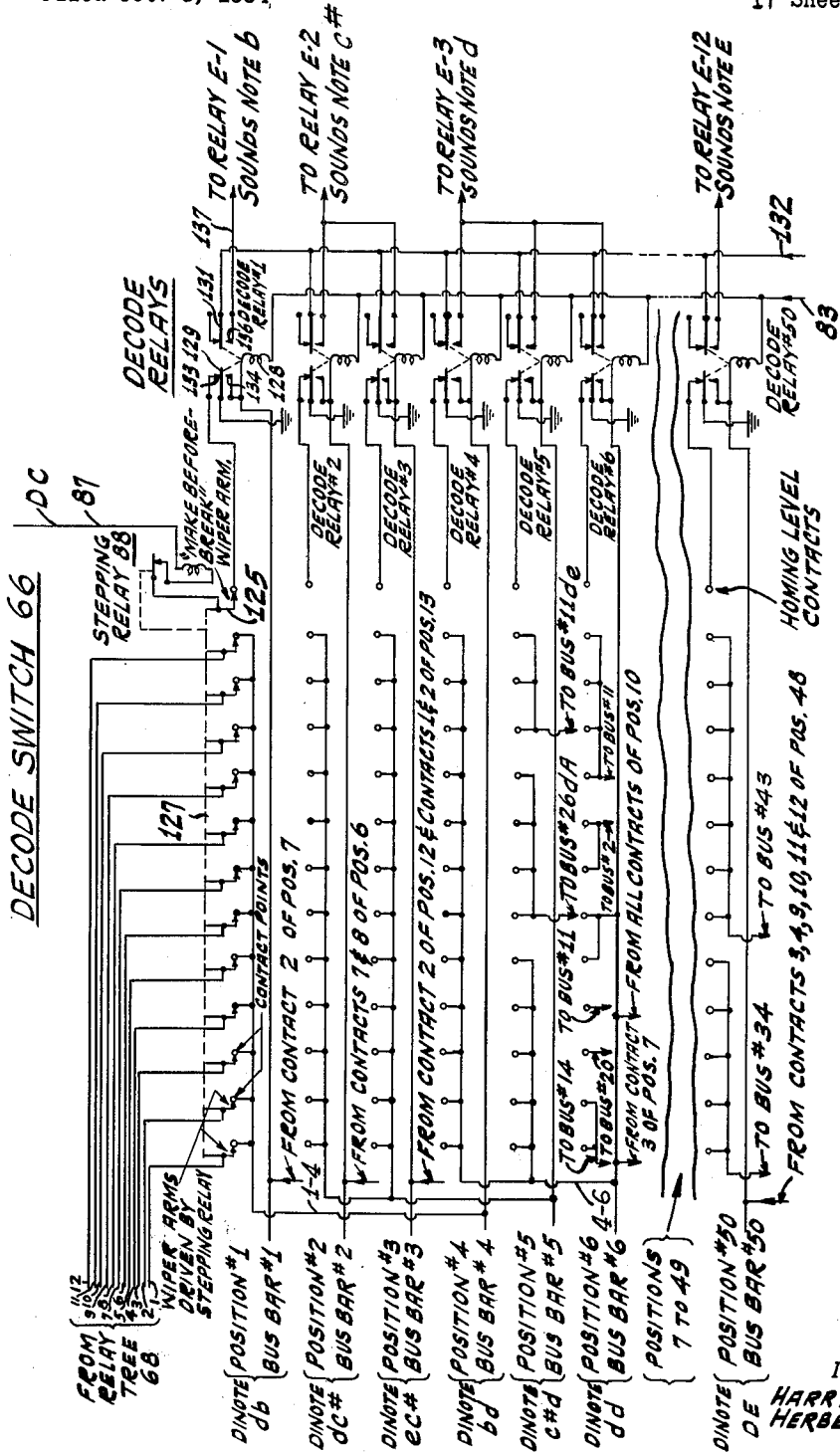
FIGURE 2 is a schematic diagram of the decode switch shown in FIGURE 1.

In operation, the particular note called for by the composing machine is determined primarily by the action of two units, namely, (1) a decode switch unit 66, shown in detail in FIGURE 2, and (2) a random unit 65 comprising in combination a random switch 67 and a relay tree 68, shown in detail, respectively, in FIGURES 3 and 4. Their design and action may be described briefly as follows:

(1) The decode switch unit 66, in the present example, is a rotary stepping switch and a plurality of bus bars, with the switch contact points and the bus bars wired in accordance with the probability of a certain trinote occurring, that is, in accordance with the probability of the occurrence of a certain note following the occurrence of a certain dinote (two notes) in Stephen Foster melodies. For instance, as will be explained in more detail hereinafter in connection with FIGURE 2, the specific wiring illustrated and hereinafter tabulated is such that if the machine has sounded the note d followed by the note c♯ (lower case being used for the lower octave), then the next sounded note will be d. Thus the last three notes are the trinote d c♯ d. In this instance there happens to be no choice as to the last sounded note d. As to the next sounded note, there is a choice. It may be d, or A, or e, there being different probabilities for the three possible choices. Thus the last three notes are now one of the three trinotes c♯ d d, c♯ d A, and c♯ d e. These examples will be better understood from the later description.

(2) The random unit 67, 68 periodically selects one of the twelve leads of the relay tree 68 and connects it to a relay tree lead 69. The selected lead is connected to ground through lead 69 each time the rotary stepping switch of a control panel 71 steps through its positions 5 and 6. The selection of one of the twelve relay tree leads is purely a random choice. It is, therefore, a random note selection control that is applied to the decode switch 66, but the actual note selection is in accordance with the known probabilities as wired into the decode switch.

The control panel 71 comprises a rotary stepping switch having eight wafer sections. This switch is wired to control the sequence of operations in the decode switch 66. It is also wired to operate the random switch 67. Note that the four right-hand wafer sections of the rotary switch connect together each of four pairs of leads from the random switch 67 when the rotary switch reaches the position shown on the drawing. This is the homing position of the rotary switch and is referred to as the No. 1 position of the six switch positions.

The rotary stepping switch of the control panel is moved from its No. 1 or homing position and caused to step through its cycle of six positions in response to connecting leads 72 and 73 together to energize the stepping relay 74. In operation for composing music, the leads 72 and 73 preferably are connected together periodically by a rhythm control unit 76, which is driven continuously by a motor 77. A manual switch S—R may be provided for connecting leads 72 and 73 together momentarily, if desired, to start the control panel through a sequence operation.

The rotary stepping switch of the control panel makes one rotation, that is, goes through its sequence of six positions, for each note that is selected. In the specific example described this one rotation occurs in 0.12 second. Thus the manual switch S—R preferably is actuated by a two relay combination to insure that it is held closed for less than 0.12 second.

With the foregoing general description in mind, the sequence of operation for selecting and sounding a note can be followed in a general way and, therefore, will now be given. A full understanding of the sequence of operation will be had later following a more detailed circuit description.

OPERATION SEQUENCE (GENERAL)

Assume that the control panel rotary switch is in the homing position, i.e., position 1, as shown in FIGURE 1a. The system is sounding a previously selected note. The rotary switch of the rhythm control unit, and the switch S—R, are in the open position. No stepping relays are operating, and nothing further will happen until the leads 72 and 73 are connected together by the rhythm control unit (or by manual switch S—R). As will be understood later, during this period, as well as at all other times during the system operation, certain oscillators in the random switch 67 are running continuously.

Now assume that the rhythm control unit momentarily connects leads 72 and 73 together. This momentarily applies 110 volts D.C. to the stepping relay 74 of the control panel rotary switch through lead 75 to step the switch to position No. 2. The stepping relay 74 is now energized through wafer section 78 and a lead 79. It steps the wiper arms of the eight wafer sections through the next five positions in succession and back to the homing (No. 1) position where the power supply to stepping relay 74 is broken since the No. 1 contact point of wafer section 78 is not connected to ground. The switch now rests on position No. 1. It should be noted that the wiper arm 81 of wafer section 78 provides a make-before-break switching action as it rotates and wipes the six associated contact points.

Now consider the sequence, position by position, as the control panel rotary switch steps through its six positions:

*Position 1: a selected note being sounded*

(1) At the wafer section 82 the 110 volt A.C. supply is connected through to a lead 83 to permit energizing of any one of the decode relays (FIGURE 2) in the decode switch 66. The wiper arm of this section is make-before-break.

(2) At the wafer section 84 the lead 69 from relay tree 68 is disconnected from ground. The wiper arm of this section is make-before-break.

(3) At the wafer section 86 a lead 87 is connected to the high side of the 110 volt D.C. supply to make energizing current available to the decode switch stepping relay 88 (FIGURE 2).

(4) At the wafer sections 91, 92, 93 and 94, the two leads of each pair of leads from the random switch 67 are connected together as part of the sequence for making the random selection of one of the twelve leads from the relay tree 68.

*Position 2*

(1) At wafer 82 the A.C. supply is still connected to the lead 83.

(2) At wafer 84 the lead 69 from the relay tree is still disconnected from ground, and will continue to be disconnected until position 5 is reached.

(3) At wafer 86 the D.C. supply to the lead 87 is broken and remains broken through the following positions until position 1 is again reached, thus disabling the stepping relay 88 (FIGURE 2) of the decode switch.

(4) At the wafer sections 91, 92, 93, and 94 the connections between pairs of leads from random switch 67 are broken whereby the random selection of one of the twelve leads from relay tree 68 is made. The connections between pairs of leads remains broken until position 1 is again reached.

*Position 3*

(1) At wafer 82 the A.C. supply through lead 83 is interrupted, thereby de-energizing any decode relay (FIGURE 2) of the decode switch that is energized at the time and that is causing a note to be sounded. This terminates the sounding of the note.

(2) At wafer 84, relay tree lead 69 is still ungrounded.

(3) At wafer 86 the decode switch stepping relay 88 (FIGURE 2) is still disabled.

*Position 4*

(1) At wafer 82 the A.C. supply is again connected to lead 83 to permit energizing of the decode relays (FIGURE 2), and will continue to be so connected until position 3 is again reached.

(2) At wafer 84 relay tree lead 69 is still ungrounded.

(3) At wafer 86 the decode switch stepping relay 88 (FIGURE 2) is still disabled.

Position 5

(1) At wafer 82 the A.C. is still supplied to lead 83 to permit energizing the decode relays.

(2) At wafer 84 relay tree lead 69 is now connected to ground and the choice of the random unit is made known to the decode switch 66. This action will be described in detail in connection with FIGURE 2. At present, referring to FIGURE 2, it may be noted that said random choice is made known at the decode switch by energizing one of the fifty decode relays which is then held energized by a holding circuit. At the same time the new selected note is sounded.

(3) At wafer 86 the decode switch stepping relay 88 (FIGURE 2) is still disabled.

Position 6

In this position the connections are the same as in position 5, thus giving additional time for relay operation. This position was employed in the example illustrated as a matter of convenience since a six-position switch was readily available.

Position 1

Coming back to this position there is the following sequence for selecting the next note:

(1) At wafer 78 the wiper arm 81 breaks contact with the connection to ground, the stepping relay 74 is de-energized, and the rotary switch is homed on position 1.

(2) At wafer 82 the A.C. is still being supplied to lead 83 so that the decode relay (FIGURE 2) energized during position 5 remains energized.

(3) At wafer 84 relay tree lead 69 is disconnected from ground. However, the choice that was made by the random unit has been stored in the decode switch 66 by the holding relay circuit of a decode relay as mentioned with reference to position 5.

(4) At wafer 86 the D.C. supply circuit to the stepping relay 88 (FIGURE 2) is completed and the rotary switch of the decode switch 66 is stepped from the old position where the decode relay has been de-energized to the position where the newly energized decode relay is located. At that position the D.C. supply circuit to stepping relay 88 is broken (the armatures of the energized decode relay being held down) and the rotary switch stops on that position.

(5) At wafers 91, 92, 93, and 94 the two leads of each pair from the random switch 67 are again connected together so that a random selection of relay tree leads will be made as soon as said pairs are disconnected, as hereinafter described.

The system is now back to its original condition. The cycle will repeat the next time the rhythm control unit connects the leads 72 and 73 together, and a new note will be selected. The selection will be in accordance with a probability that has been wired into the decode switch and which depends, in the present example, upon the two notes that were previously selected.

The results of the above-described sequence of operations may be described as follows with reference to the control panel switch positions:

Position 1

A note is sounding. The system is in a homed condition and remains so until the rhythm control unit 76 initiates another cycle of operation.

Position 2

The random selection is made by the random unit but not yet made known to the decode switch 66.

Position 3

The energizing circuit to the decode relays of the decode switch 66 is broken, thus de-energizing the decode relay that was causing a note to be sounded. The sounding of the note ceases.

Position 4

The energizing circuit to the decode relays is again closed at wafer section 82, but said circuit is not yet completed because lead 69 of the relay tree is still disconnected from ground.

Positions 5 and 6

The random selection of one of the twelve relay tree leads is made known to the decode switch 66 by connecting relay tree lead 69 to ground, a certain decode relay is energized, and the newly selected note is sounded. This note selection was made in accordance with both the random selection and the probability wiring of the decode switch.

Position 1

The rotary switch of the control panel stops, now being on its homing position.

The stepping relay 88 of the decode switch is energized, and it steps its rotary switch to the position where the energized decode relay (now sounding the new note) is located. Said energized decode relay is being held energized by its holding circuit, the relay tree lead 69 having been disconnected from ground.

The pairs of random switch leads have again been connected so that the random unit is again ready to make a random selection of the twelve leads.

Before considering the system operation in further detail, certain units of the system will now be fully described.

RANDOM UNIT

An example of a suitable random switch 67 for the random unit is shown in FIGURE 3. It comprises four units that are identical except as to frequency of operation. Referring to the first unit, it comprises an oscillator, which in this example is a free running multivibrator MV-1, a switching device having on and off positions, which in this example is a bistable multivibrator EJ-1, an output tube O-1 and, preferably, a load balancing tube B-1. The corresponding components of the other three units are similarly identified but with numerals 2, 3, and 4 for the different units.

The coupling from the free running multivibrator to the bistable multivibrator is through a pair of leads by way of a control panel wafer switch section (FIGURE 1a). Specifically, multivibrator MV-1 is coupled to the multivibrator EJ-1 through a coupling capacitor 101, leads 102 and 103, and wafer section 91 (FIGURE 1a) when the control panel switch is in its No. 1 position.

Similarly, multivibrator MV-2 couples to multivibrator EJ-2 through capacitor 104, leads 106 and 107, and wafer section 92. MV-3 couples to EJ-3 through capacitor 108, leads 109 and 111, and wafer section 93. MV-4 couples to EJ-4 through capacitor 112, leads 113 and 114, and wafer section 94.

The multivibrators MV-1, MV-2, MV-3 and MV-4 oscillate continuously, each at a slightly different frequency. The particular frequencies employed are not important. In the example being described they run at frequencies somewhere between 1000 cycles per second and 1500 cycles per second.

During the interval that a free running multivibrator is coupled to a bistable multivibrator, the tubes of the latter are alternately rendered conducting. When the coupling is broken, the tube of the bistable multivibrator that is conducting at that instant remains conducting. This selection of a tube that remains conducting is random because of the high frequency of oscillation of the free running multivibrator as compared with the panel control switching which is making and breaking the coupling connection. Said control panel switching occurs only a few times a second in the present example.

The bistable multivibrators are direct-current coupled to the output and load balance tubes. Referring to the first unit, for example, the tube 116 of EJ–1 has its anode circuit coupled through a conductor 117 to the control grid of tube O–1. The tube 118 of EJ–1 has its anode circuit coupled through a conductor 119 to the control grid of tube B–1.

The anode circuits of the output tubes O–1, O–2, O–3, and O–4 include the four relay coils 1a, 2a, 3a, and 4a, respectively, of the relay tree 68 shown in detail in FIGURE 4. The anode circuit may be traced, referring to the first unit for example, from the plus B supply, through the common lead 121, the relay coil 1a (FIGURE 4), and through the lead 122 to the anode of tube O–1.

Similarly, anode voltage is applied to output tubes O–2, O–3, and O–4 from common lead 121 through relay coils 2a, 3a, and 4a, respectively, and through leads 123, 124 and 126, respectively, to the anodes of said tubes.

The load balance tubes B–1, B–2, B–3, and B–4 are provided as a matter of convenience to avoid difficulty in voltage regulation. It will be apparent that when tube O–1, for example, is driven to its nonconducting condition, the tube B–1 is driven to its conducting condition. Thus the load on the plus B supply remains substantially unchanged. It will be noted that there is included in the anode circuit of each load balance tube a load resistor having a resistance substantially equal to that of the relay coil in the anode circuit of the associated output tube. Voltage may be applied through resistors to the screen grids of the load balance and output tubes instead of being applied directly as illustrated. Suitable bias may be provided for the load balance and output tubes by a common cathode resistor connected between the cathodes and ground.

FIGURE 4 illustrates one form of relay tree that is suitable for use in the random unit. Such relay circuits are well known in the art and require no detailed description. It is evident upon inspection that the relay tree input lead 69 is connected through to a particular one of the twelve output leads 1 through 12 depending upon which relay coil or combination of relay coils 1a, 2a, 3a, 4a is energized for actuating the relay tree.

In the example illustrated, the four bottom pairs of the sixteen relay contacts at the left of the relay tree 68 are connected as shown, two contacts to a lead. Thus relay tree leads 9, 10, 11, and 12 will each have two chances out of sixteen of being connected through during the random selection. The other leads 1 to 8, inclusive, each have one chance in sixteen of being connected through. This particular connection of leads and contacts is used since in the specific apparatus illustrated the decode switch has a row of twelve contacts at each position (FIGURE 2). The fact that leads 9, 10, 11, and 12 each have two chances out of sixteen of being connected through is taken into account in wiring the decode switch in accordance with the probabilities (the trinote probabilities in this example).

OPERATION OF RANDOM UNIT

The overall operation of the random unit will now be described with reference to FIGURES 1a, 1b, 3 and 4. Assume, for example, that the rotary switch of the control panel 71 (FIGURE 1a) is on position 2. There is now no coupling from the free running multivibrators to the bistable multivibrators (FIGURE 3). Each of the bistable multivibrators has one of its tubes conducting. Whether a particular output tube O–1, O–2, O–3, and O–4 is conducting or is cut off depends upon which tube of its associated bistable multivibrator is conducting.

Next assume that the control panel switch has been stepped around to position 1. Now the coupling circuits from the free running multivibrators to the bistable multivibrators are closed and the tubes of the latter are made alternately conducting and nonconducting.

Next when the control panel switch is moved off position 1 the coupling circuits to the bistable multivibrators are broken, and said multivibrators remain in the condition they were in at the instant the coupling circuits were broken. It is purely a random choice whether one or the other tube of a bistable multivibrator is left in the conducting state.

From this it follows that it is purely a random choice whether an output tube (O–1, O–2, et cetera) is left conducting or nonconducting and, therefore, whether a relay coil (1a, 2a, et cetera) is energized or not. Thus the choice of connection from conductor 69 through the relay tree to a particular one of the twelve leads is purely a random choice.

The random unit described is only one example of various possible designs. The oscillators, for example, might be replaced by noise sources. Other on-off devices may replace the bistable multivibrator. The relay tree may be either mechanical or electronic and, in fact, may be replaced by any circuitry that couples an input lead to a selected output lead as a function of a plurality of actuating circuits.

DECODE SWITCH

A suitable decode switch 66 for use in the present example of the invention is illustrated in FIGURE 2. It comprises a rotary stepping switch of conventional design which is shown schematically in the drawing. It is a fifty position switch having twelve contact points at each position for decoding and a thirteenth contact point (the last one reading from left to right) for the stepping action. Described differently, the switch has fifty possible settings and has twelve circuits at each setting. A wiper arm is associated with each contact point. In order to simplify the drawing, illustration of positions 7 to 49, inclusive, has been omitted. It will be understood that the wiper arms are stepped from position 1 to positions 2, 3, et cetera to position 50, and from position 50 to position 1.

The wiper arms are tied together mechanically as indicated by the broken line 127. They are stepped from one switch position or setting to the next by the stepping relay 88 when it is energized. Note that one terminal of the winding of stepping relay 88 is connected through lead 87 and wafer section 86 (FIGURE 1a) of the control panel switch to the high side of the 110 volt D.C. supply when said switch is in the No. 1 or homing position. The other terminal of said winding may be connected through the stepping relay contact point and armature, the wiper arm 125, the thirteenth contact point, and through the associated decode relay to ground as described hereinafter, thus energizing the stepping relay to step the rotary switch forward one position.

The decode switch 66 further comprises fifty signal responsive devices which, in the present example, are decode relays, there being one decode relay for each position of the rotary stepping switch. The decode relays for positions 7 to 49, inclusive, are not illustrated.

Since all the decode relays are alike, a description of decode relay No. 1 is sufficient. It comprises a relay coil 128 having associated with it two armatures 129 and 131 which are pulled down when the relay coil is energized. The relay armature 129 is connected to ground, as are the corresponding armatures in the other decode relays. The armature 131 is connected through a bus to a conductor 132 leading to the low side of the 110 volt A.C. supply (FIGURE 1a). The corresponding armatures in the other decode relays are similarly connected.

The left-hand armature 129 has associated with it an upper contact 133 that is connected to the thirteenth contact point of the rotary switch, and a lower contact 134 that is connected to the upper terminal of the winding 128. The right-hand armature 131 has associated with it an upper contact which functions only as a stop, and a lower contact 136 that is connected to a lead 137. The lead 137 goes to the relay coil of relay E–1 (FIGURE 1a).

If decode relay No. 1 is energized, a connection is completed from the low side of the 110 volt A.C. supply (FIGURE 1a), through lead 132, armature 131, contact 136, lead 137, through the coil of relay E–1 (FIGURE 1a), through the bus common to relays E–1, E–2, et cetera, and through a lead 138 (FIGURE 1a) to the high side of the 110 volt A.C. supply. Thus the tuning fork A-6 is connected through to the octaver 61 and the note b (lower octave) is selected and sounded.

The decode switch 66 further comprises, for convenience in wiring, a bus bar for each rotary stepping switch position. They are identified on the drawing as bus bar No. 1, bus bar No. 2, et cetera. These bus bars may be wires mounted on a frame like the strings of a harp and positioned adjacent to the rotary switch.

Each bus bar is connected to one terminal of the corresponding decode relay winding. Thus the bus bar No. 1 is connected to a terminal of relay winding 128. The other terminal of winding 128 is connected through a bus to the lead 83, through the lead 83 to wafer section 82 (FIGURE 1a) of the control panel, and through wafer section 82 (except for position 3 of said wafer section) through a lead 139 to the high side of the 110 volt A.C. supply.

It will be apparent from the drawing that the windings of the other decode relays are similarly connected between the A.C. energizing lead 83 and the bus bar associated with that particular decode relay.

It is now apparent that if a bus bar, such as bus bar No. 1, has a ground connection applied to it, the corresponding decode relay (decode relay No. 1 in this instance) will be energized, assuming wafer section 82 (FIGURE 1a) of the control panel is not on position 3. After said ground connection is removed, the decode relay will remain energized because of the holding circuit that may be traced from contact 134 through armature 129 to ground.

It has previously been explained how the random unit (FIGURE 1a) makes random selection of one of the twelve leads from relay tree 68 to connect it through to ground when the wafer section 84 of the control panel switch is in positions 5 and 6. Thus referring to FIGURE 2, any one of the twelve relay tree leads shown at the top of the drawing may be connected to ground momentarily during the cycle of operation.

The twelve leads (leads 1 through 12) from relay tree 68 are connected to the twelve wiper arms, respectively, from left to right as illustrated.

We now come to the wiring of the decode switch in accordance with the trinote probability previously mentioned. It is to be understood that this merely one specific example of the invention.

PROBABILITY CONNECTIONS

The probabilities are wired into the decode switch (FIGURE 2) by connecting a certain number of the rotary switch contact points located at one switch position to a certain bus bar of a following position or to different bus bars of different following positions. Consider the specific probability wiring shown in FIGURE 2.

At position 1 all contact points are connected together and are connected through a lead 1-4 to the bus bar No. 4 at position 4. Therefore, if the rotary switch is on position 1 (the note b sounded), the next cycle of operation initiated by the rhythm control unit will cause the rotary switch to be stepped to position 4 where it will stop, and where the note d is being sounded. The operation sequence will be described hereinafter.

The next cycle of operation, again initiated by the rhythm control unit, will cause the rotary switch to be stepped from position 4 to position 6, since all contact points of position 4 are connected together and are connected through a lead 142 to the bus bar No. 6 associated with position 6. At position 6 the note d is again being sounded. It happens that in this example there is no choice as to the next switch position when the decode switch is on either position 1 or position 4.

From position 6 the rotary switch may be stepped to any one of five different positions since the contact points of this position are connected as follows: Reading from left to right, the first two contact points are both connected to bus bar No. 14 (not shown) associated with switch position 14. The third contact point is connected to bus bar No. 20 (not shown). The fourth contact point and the last four contact points are connected to bus bar No. 11 (not shown). The fifth and sixth contact points are connected to bus bar No. 6. The seventh and eighth contact points are connected to bus bar No. 2. It may be noted that there is no reason why the fourth contact point should be connected to bus bar No. 11 instead of one of the other of the first eight contact points. The same is true as to the connection of the third contact point to bus bar No. 20, and as to connections of other contact points, having the same probability of being selected by the random unit, to their bus bars.

Now consider what may happen when the rhythm control unit initiates the next cycle of operation to sound the next note. The rotary switch will go from position 6 to one of five possible positions, namely, positions 11, 14, 20, 2 or 6. The fifth choice (position 6) means that the switch does not move off position 6 and that note d is sounded again.

Which one of the five positions to which the decode switch goes (from position 6) is determined by the random unit's selection of one of the twelve leads from relay tree 68. If either lead 1 or 2 is selected, a ground connection will be applied during the cycle of operation through either the first or second contact point to the bus bar No. 14 whereby the decode switch will be stepped from position 6 to position 14. At position 14 the note F♯ is being sounded.

There is one chance in sixteen that lead 1 will be selected by the random unit. There is likewise one chance in sixteen that the lead 2 will be selected by the random unit. Since at position 6 ground will be applied to the bus bar No. 14 if either lead 1 or lead 2 is selected, there are two chances in sixteen that the position 14 note F♯ will be sounded following the position 6 note d.

Also as to each one of the relay tree leads 3 to 8, inclusive, there is one chance in sixteen that it will be selected by the random unit. Thus referring to the wiring for position 6, there is one chance in sixteen that the decode switch will be stepped from position 6 to position 20, two chances in sixteen that it will remain on position 6, two chances in sixteen that it will be stepped to position 2, and nine chances in sixteen that it will be stepped to position 11. As to the nine to sixteen probability of stepping to position 11, it will be recalled that there is a two in sixteen probability for each of the leads 9, 10, 11, and 12, each of these leads being connected to two relay tree contacts as shown in FIGURE 4.

In the example shown in FIGURE 2, each decode switch position represents a dinote, that is, a two-note sequence. Referring to position 5 where the note d is being sounded, the previously sounded note was c♯ since bus bar No. 5 is connected to the contact points of positions 2 and 3, and since at either position 2 or 3 the note c♯ is sounded. Thus the dinote at position 5 is c♯ d as indicated by the legend.

Again, refer to position 4 where the note d is being sounded. The bus bar No. 4 is connected to the contact points of position 1. Thus the previously sounded note was b since the rotary switch steps from position 1 to position 4. Therefore, the dinote at position 4 is bd.

The decode switch wiring is such that, similarly, at any one of the fifty decode switch positions where a note corresponding to that position is being sounded, said note was preceded by one specific note. Because of this it can be said that each of the fifty decode switch positions has a dinote wiring, the dinote being the note being sounded at said position and the note that was sounded immediately preceding.

While the statement that each switch position has a dinote wiring may sound as though the decode switch is wired according to dinote probabilities, this is not the case in this example being described. The wiring of the decode switch is done solely in accordance with trinote probabilities or frequencies. This will be understood from the following:

In starting the wiring of the decode switch, that is, the wiring of contact points to bus bars, a dinote that occurs in the type of music to be composed (referring to the present example of the invention) is arbitrarily selected. For instance, the wiring might have been started with the dinote c♯ d, using position 5 as the point of reference for wiring, position 5 being one position where note d is sounded. The connection from bus bar 5 is then to the contact points of a preceding position where note c♯ is sounded, that is, to contact points at positions 2 or 3, or both.

Now the trinote probability table (FIGS. 9a and 9b) is referred to. It is noted as to the trinote c♯ d d that the probability of the note d following the dinote c♯ d is five in sixteen. The probability table of FIGS. 9a and 9b and its use will be explained in more detail hereinafter. This probability is wired in by connecting the first five contacts of position 5 together and connecting them through lead 142 to the bus bar No. 6. Thus note d will be sounded next if the random selection puts ground on leads 1, 2, 3, 4, or 5 of relay tree 68 while the rotary switch is on position 5.

It is further noted from the probability table that as to the trinote c♯ d A the probability of the note A following the dinote c♯ d is five in sixteen. This probability is wired in by connecting the sixth, seventh, eighth, ninth contact points of position 5 to the bus bar No. 26 (not shown) that is connected to decode relay No. 26 for sounding the note A. Thus note A will be sounded next if the random selection puts ground on leads 6, 7, 8, or 9 while the rotary switch is on position 5. It should be remembered that relay tree leads 9, 10, 11, and 12 each have two chances in sixteen of being selected, whereas the other relay tree leads have one chance in sixteen of being selected.

It is further noted from the probability table that as to the trinote c♯ d e the probability of the note e following the dinote c♯ d is six in sixteen. This probability is wired in by connecting the tenth, eleventh, and twelfth contact points of position 5 to the bus bar No. 11 (not shown) that is connected to decode relay No. 11 for sounding the note e. Thus note e will be sounded next if the random selection puts ground on leads 10, 11, or 12 while the rotary switch is on position 5.

The decode switch wiring is continued in the above-described manner until completed. Let us follow through the probability wiring procedure one further step, using position 6 as a reference point. Stepping to position 6 from position 5 had resulted in sounding the note sequence (the trinote) c♯ d d. The next trinote will be the dinote dd followed by a third note. Reference is made to the trinote probability table (FIGS. 9a and 9b) to learn the frequency or probability of occurrence of such trinotes.

It is found that as to the trinote d d F♯ there are two chances in sixteen of the note F♯ following the dinote dd. Therefore, the first and second contact points (position 6) are connected to bus bar No. 14 whereby decode relay No. 14 will sound note F♯ if the random unit selects either relay tree lead 1 or lead 2. It will be understood that instead of these particular two contact points, any other two of the first eight contact points might have been connected to bus bar No. 14, or a single one of the last four contact points might have been connected to bus bar No. 14.

The table shows that as to trinote d d G there is one chance in sixteen of the note G following the dinote dd. Therefore, a single contact point (the third one) is connected to the bus bar No. 20 whereby decode relay No. 20 will sound note G if the random unit selects relay tree lead 3.

As to the trinote d d e there are nine chances in sixteen that the note e will follow the dinote dd. Therefore, the fourth contact point and the last four contact points are connected to bus bar No. 11 whereby decode relay No. 11 will sound note e if the random unit selects any one of relay tree leads 4, 9, 10, 11, or 12.

As to trinote d d d there are two chances in sixteen that the note d will follow the dinote d d. Therefore, the fifth and sixth contact points are connected to the bus bar No. 6 so that the note d will be sounded again if either relay tree lead 5 or 6 is selected by the random unit.

As to trinote d d c♯ there are two chances in sixteen that the note c♯ will follow the dinote d d. Therefore, the seventh and eighth contact points are connected to bus bar No. 2. Thus the decode switch will cause note c♯ to be sounded if the random unit selects either relay tree lead 7 or 8, and the wiper arms of the decode switch will move to position 2.

The complete decode switch wiring is tabulated in the following table:

DECODE SWITCH WIRING

| Decode switch position | Tabulation showing the bus bar that is connected to a particular contact point at a particular switch position | | | | | | | | | | | |
|---|---|---|---|---|---|---|---|---|---|---|---|---|
| | 1 | 2 | 3 | 4 | 5 | 6 | 7 | 8 | 9 | 10 | 11 | 12 |
| 1 | 4 | 4 | 4 | 4 | 4 | 4 | 4 | 4 | 4 | 4 | 4 | 4 |
| 2 | 5 | 5 | 5 | 5 | 5 | 5 | 5 | 5 | 5 | 5 | 5 | 5 |
| 3 | 5 | 5 | 5 | 5 | 5 | 5 | 5 | 5 | 5 | 5 | 5 | 5 |
| 4 | 6 | 6 | 6 | 6 | 6 | 6 | 6 | 6 | 6 | 6 | 6 | 6 |
| 5 | 6 | 6 | 6 | 6 | 6 | 26 | 26 | 26 | 26 | 11 | 11 | 11 |
| 6 | 14 | 14 | 20 | 11 | 6 | 6 | 2 | 2 | 11 | 11 | 11 | 11 |
| 7 | 14 | 1 | 6 | 26 | 41 | 44 | 44 | 44 | 14 | 14 | 11 | 11 |
| 8 | 14 | 14 | 14 | 20 | 11 | 11 | 11 | 11 | 11 | 11 | 11 | 11 |
| 9 | 14 | 14 | 14 | 14 | 14 | 11 | 11 | 11 | 11 | 11 | 11 | 11 |
| 10 | 6 | 6 | 6 | 6 | 6 | 6 | 6 | 6 | 6 | 6 | 6 | 6 |
| 11 | 12 | 12 | 15 | 15 | 7 | 12 | 27 | 12 | 7 | 15 | 15 | 15 |
| 12 | 7 | 3 | 15 | 15 | 7 | 7 | 7 | 12 | 7 | 7 | 7 | 7 |
| 13 | 3 | 3 | 27 | 45 | 7 | 12 | 12 | 12 | 7 | 7 | 7 | 7 |
| 14 | 28 | 28 | 28 | 28 | 13 | 13 | 13 | 16 | 13 | 21 | 13 | 16 |
| 15 | 21 | 21 | 35 | 38 | 8 | 13 | 16 | 16 | 13 | 21 | 16 | 16 |
| 16 | 21 | 21 | 28 | 8 | 8 | 8 | 16 | 16 | 13 | 13 | 16 | 16 |
| 17 | 21 | 21 | 21 | 21 | 21 | 21 | 21 | 21 | 13 | 13 | 13 | 13 |
| 18 | 21 | 16 | 16 | 16 | 8 | 35 | 28 | 28 | 13 | 13 | 8 | 8 |
| 19 | 16 | 16 | 16 | 16 | 16 | 13 | 13 | 13 | 13 | 13 | 13 | 13 |
| 20 | 17 | 17 | 17 | 36 | 36 | 36 | 36 | 17 | 17 | 17 | 17 | 17 |
| 21 | 17 | 17 | 17 | 17 | 36 | 36 | 36 | 22 | 17 | 29 | 29 | 22 |
| 22 | 9 | 9 | 9 | 9 | 9 | 9 | 9 | 9 | 22 | 22 | 22 | 22 |
| 23 | 17 | 17 | 17 | 17 | 17 | 17 | 17 | 17 | 17 | 17 | 17 | 17 |
| 24 | 36 | 36 | 36 | 36 | 36 | 36 | 36 | 36 | 36 | 36 | 36 | 36 |
| 25 | 30 | 30 | 30 | 30 | 30 | 30 | 30 | 30 | 30 | 30 | 30 | 30 |
| 26 | 18 | 18 | 18 | 18 | 31 | 31 | 31 | 31 | 31 | 31 | 31 | 31 |
| 27 | 31 | 37 | 37 | 37 | 31 | 31 | 31 | 31 | 31 | 31 | 31 | 31 |
| 28 | 18 | 18 | 37 | 37 | 37 | 46 | 31 | 31 | 31 | 31 | 31 | 31 |
| 29 | 9 | 9 | 46 | 46 | 46 | 46 | 31 | 31 | 31 | 31 | 31 | 31 |
| 30 | 37 | 37 | 37 | 37 | 37 | 37 | 37 | 37 | 37 | 37 | 37 | 37 |
| 31 | 31 | 31 | 23 | 37 | 25 | 37 | 31 | 37 | 31 | 37 | 18 | 18 |
| 32 | 31 | 31 | 23 | 37 | 9 | 46 | 46 | 18 | 18 | 18 | 18 | 18 |
| 33 | 31 | 31 | 18 | 18 | 18 | 18 | 18 | 18 | 18 | 18 | 18 | 18 |
| 34 | 31 | 31 | 31 | 31 | 31 | 31 | 31 | 31 | 31 | 31 | 31 | 31 |
| 35 | 32 | 32 | 32 | 32 | 32 | 32 | 32 | 32 | 32 | 32 | 32 | 32 |
| 36 | 32 | 32 | 32 | 32 | 32 | 32 | 32 | 32 | 32 | 32 | 32 | 32 |
| 37 | 32 | 32 | 32 | 32 | 19 | 10 | 38 | 47 | 32 | 32 | 32 | 32 |
| 38 | 32 | 32 | 32 | 32 | 19 | 19 | 47 | 47 | 32 | 32 | 32 | 32 |
| 39 | 32 | 32 | 32 | 32 | 32 | 32 | 32 | 32 | 32 | 32 | 32 | 32 |
| 40 | 32 | 32 | 38 | 38 | 24 | 32 | 32 | 32 | 38 | 38 | 47 | 47 |
| 41 | 48 | 48 | 48 | 48 | 48 | 48 | 48 | 48 | 48 | 48 | 48 | 48 |
| 42 | 39 | 39 | 39 | 39 | 39 | 39 | 39 | 39 | 39 | 39 | 48 | 48 |
| 43 | 48 | 48 | 48 | 48 | 48 | 48 | 48 | 48 | 48 | 48 | 48 | 48 |
| 44 | 42 | 42 | 42 | 40 | 40 | 40 | 33 | 33 | 40 | 40 | 40 | 40 |
| 45 | 42 | 42 | 42 | 42 | 42 | 42 | 42 | 42 | 42 | 42 | 42 | 42 |
| 46 | 42 | 42 | 42 | 40 | 40 | 40 | 40 | 40 | 33 | 33 | 33 | 49 |
| 47 | 42 | 42 | 42 | 42 | 42 | 40 | 40 | 37 | 37 | 37 | 37 | 37 |
| 48 | 40 | 40 | 50 | 40 | 40 | 40 | 40 | 40 | 50 | 50 | 50 | 50 |
| 49 | 40 | 40 | 40 | 40 | 40 | 40 | 40 | 40 | 40 | 40 | 40 | 40 |
| 50 | 34 | 34 | 34 | 34 | 34 | 43 | 43 | 43 | 43 | 43 | 43 | 43 |

Referring to the decode switch wiring table, the numerals 1 to 12, inclusive, on the upper line indicate the twelve contact points of the decode switch located at any one of the fifty switch positions. The numerals tabulated underneath indicate the bus bar at a particular switch position. This will be understood from an example or two, particularly if reference is also made to FIGURE 2 of the drawing.

The table shows that the twelve contact points at the decode switch position 1 are all connected to the bus bar No. 4. The table shows that the twelve contact points at the decode switch position 5 are connected as follows: Contact points 1, 2, 3, 4, and 5 are connected to bus bar No. 6; contact points 6, 7, 8 and 9 are connected to bus bar No. 26; contact points 9, 10, 11, and 12 are connected to bus bar No. 11. In this manner the table gives the complete probability wiring of the decode switch for the specific example being described.

SEQUENCE OF OPERATION

The sequence of steps in the system operation will now be described, particularly to show the memory or holding action and to show how the decode switch is stepped form one position to another.

Assume that the decode switch is in position 1, that is, that the wiper arms of the decode switch are on position 1, as shown in FIGURE 2. Assume that the armatures of decode relay No. 1 are in their lower position and are being held down by the holding circuit whereby note b is being sounded. Assume also that the control panel switch (FIGURE 1) is on its homing position 1.

Now the rhythm control unit 76 is started in operation so that the leads 72 and 73 (FIGURE 1) are connected together momentarily. The control panel rotary switch is now stepped through its six positions and back to the homing position in about 0.12 second in the specific example illustrated. Consider the sequence as this was happening.

The random unit selects one of the relay tree leads 1 to 12 since the coupling connections from the free running multivibrators to the bistable multivibrators (FIGURE 3) are broken as soon as the control panel switch leaves its homing position. This has no immediate effect since the relay tree lead 69 (FIGURE 1a) is not connected to ground.

The D.C. supply circuit to the decode switch stepping relay 88 (FIGURE 2) is broken at wafer section 86 (FIGURE 1a) so that said stepping relay cannot operate until the control panel switch comes back to its homing position 1.

Next at control panel position 3, the A.C. supply through lead 83 to the decode relays No. 1 through No. 50 is broken momentarily, thus releasing the decode relay that had been held energized by its holding circuit. In the example assumed, it is decode relay No. 1 that is released so that its armatures go to their upper position.

As a result, the sounding of note b is stopped. Also the decode switch stepping relay 88 now has a connection completed through contact 133 of decode relay No. 1 to ground whereby the decode switch will be stepped forward as soon as current is supplied to lead 87. This will not happen until the control panel switch comes back to its homing position.

It may be noted that while both A.C. and D.C. operated relays have been illustrated in the system, this is merely a matter of convenience. All A.C. relays or all D.C. relays may be employed.

Next at control panel switch position 4, the A.C. supply circuit for the decode relays No. 1 through No. 50 (FIGURE 2) is again closed at the wafer switch 82 (FIGURE 1a). However, no decode relay is energized at this time because the supply circuit must be completed through the associated bus bar (one of the bus bars No. 1 through No. 50) by applying ground to the bus bar.

Next at control panel switch positions 5 and 6 (the two positions functioning alike) the random selection of the random unit is made known to the decode switch. Specifically, the relay tree lead 69 (FIGURE 1a) is connected to ground, thus grounding the selected one of the relay tree leads 1 to 12.

In the case assumed where the sequence started with the decode switch on position 1, the selection of any one of the twelve relay tree leads causes ground to be applied to the bus bar No. 4 when position 5 of the control panel switch is reached. This is because all twelve contact points of position 1 of the decode switch are connected through lead 1—4 to bus bar No. 4. As a result, decode relay No. 4 is energized, and is held energized by its holding circuit. The new not d is now sounded.

Next the control panel switch reaches its homing position 1 and stops there. The D.C. supply circuit to the decode switch stepping relay 88 is now completed at the wafer switch section 86 (FIGURE 1a) so that current flows through the lead 87, the relay 88, contact 133 and armature 129 of decode relay No. 1, to the ground side of the D.C. supply. This causes stepping relay 88 to step the wiper arms of the rotary switch forward to position 2. The wiper arm 125 is make-before-break so that the D.C. supply to the stepping relay coil is not broken as said wiper arm moves to the next position. Since the decode relay No. 2 is not energized, its armatures are in the upper position. Therefore, the stepping relay 88 still has D.C. applied to it, and the decode switch is stepped to the next position 3.

Thus the decode switch is stepped forward repeatedly until the wiper arms of the rotary switch reach the position where the decode relay is energized. In the example given, this is decode relay No. 4, ground having been applied to the bus bar No. 4 during control panel switch positions 5 and 6 as above described. At decode switch position 4, the power supply to the stepping relay 88 is broken (the left-hand armature of the energized decode relay No. 4 being in the lower position), and the decode switch comes to rest on said position 4.

When the control panel switch (FIGURE 1a) moved to its homing position No. 1, two things were done with respect to the random unit. First, the connection of relay tree lead 69 to ground by way of wafer section 84 was broken. This did not affect the setting of the decode switch unit 66 since the decode relay that had just been selected and energized (decode relay No. 4) was held energized by its holding circuit. Second, the coupling connections from the free running multivibrators to the bistable multivibrators of the random switch (FIGURE 3) were completed at switch wafers 91, 92, 93, and 94 (FIGURE 1) to put the random unit in condition for the next random selection. These two things actually are done substantially simultaneously in the example shown, there being no objection to this because it takes a certain amount of time for mechanical relays to operate. Therefore, the random switch operation, initiated by completing said coupling connections, does not have time to cause energization of another decode relay in the decode switch before ground is taken off the relay tree lead 69.

The system now rests with the control panel switch on its position 1, with the decode switch on its position 4, and with decode relay No. 4 energized and causing note d to be sounded. The system rests in this condition until the rhythm control unit again connects leads 72 and 73 together. Then the above-described cycle is repeated.

During this next cycle the random unit again selects one of the twelve relay leads. Again it happens that in the example shown there is no choice in the next note to be sounded since all twelve contact points of position 4 of the decode switch are connected through lead 4—6 to the bus bar No. 6. So regardless of the relay tree lead selected, the decode relay No. 6 is energized during the control panel cycle, and in the example illustrated, the note d is again sounded. The cycle ends with the decode switch being stepped to position No. 6.

The next time the rhythm control unit initiates the cycle of operation, the random unit again selects one of the twelve relay tree leads. This time there is a choice as to the next note sounded, as has been previously described.

If, for instance, either relay tree lead 1 or 2 is selected by the random unit, ground will be applied momentarily to the bus bar No. 14 (not shown) during the cycle of operation, decode relay No. 14 (not shown) will be energized and the note F♯ will be sounded. Again the cycle will end with the decode switch being stepped forward, in this instance, to its position 14. That note F♯ is sounded as a result of ground being applied to the bus bar No. 14 is seen by reference to the dinote code shown in FIGURE 8 where the dinote for bus bar No. 14 is shown as d F♯.

The basis of the system wiring for playing Stephen Foster type melodies will now be discussed in more detail, and with reference to FIGURES 7, 8, 9a, and 9b.

FIGURE 7 shows the twelve notes that are used in the present example for composing Stephen Foster type melodies. The first four notes are referred to as the lower octave notes as indicated by the legend. They appear at the output of the octaver 61 (FIGURE 1a). The remaining notes are the upper octave notes which appear at the output of the octaver 62.

It was found that these twelve notes were sufficient for composing the desired type of music after an analysis of many Stephen Foster songs. For analysis, all the songs were transposed to the key of D. It was found that eleven songs could be selected which had fifty dinotes and 136 different trinotes. The eleven songs selected were:

(1) Old Black Joe
(2) Old Folks at Home
(3) Massa's in the Cold, Cold Ground
(4) Hard Times, Come Again No More
(5) Uncle Ned
(6) My Old Kentucky Home
(7) Oh, Suzannah
(8) Camptown Races
(9) Oh! Boys, Carry Me 'Long
(10) Ring, Ring de Banjo
(11) Under the Willow She's Sleeping The fifty dinotes are tabulated in FIGURE 8. For convenience in use in wiring the decode switch they are tabulated according to the frequency sequence of the last note of the dinote, the first dinote in said tabulation sequence being assigned to bus bar No. 1 of the decode switch. Thus referring to FIGURE 8, the dinote d b is assigned to bus bar No. 1 since b is the lowest frequency note. Since c♯ is the next note in ascending frequency, the dinote d c♯ is assigned to bus bar No. 2. Finally, the dinote D E, which has the highest note E as the second sounded note, is assigned to bus bar No. 50.

An inspection of the dinote code table of FIGURE 8 shows what note is sounded when ground (through relay tree 68) is applied to a particular bus bar of the decode switch. For example, if ground is applied to bus bar No. 20 during the operation sequence, note G is sounded. From the earlier description it will be understood that a dinote is, in this example, a sequence of two notes. Therefore, referring to the dinote d G assigned to bus bar No. 20, it is evident that the note d was sounded preceding the sounding of note G.

It is evident that having the dinote tabulation of FIGURE 8, it is immediately possible to connect the decode relays (FIGURE 2) to the proper note-sounding relays E-1, E-2, et cetera. Referring to the first dinote d b, for example, decode relay No. 1 (energized through bus bar No. 1) is connected for energizing the relay sounding note b, namely, relay E-1 (FIGURE 1). Similarly, referring to the next two dinotes, both of which end in c♯, the decode relays Nos. 2 and 3 (energized through bus bars Nos. 2 and 3) are connected for energizing the relay sounding the note c♯, namely, relay E-2.

The trinote probability table for the eleven Stephen Foster songs above mentioned is shown in FIGURES 9a and 9b. As above mentioned, there are 136 different trinotes (a trinote being a sequence of three notes) in the eleven Stephen Foster songs selected. These trinotes are tabulated in FIGURES 9a and 9b in a manner showing how many chances in sixteen there are that the last note of a particular trinote will follow the two preceding notes (a dinote). The figure sixteen was selected because the relay tree 68 in the random unit has sixteen output contacts.

In the trinote table of FIGURES 9a and 9b, the fifty dinotes are first tabulated. It happens that they are not tabulated in the same order as in FIGURE 8, the order of tabulation not being important. For convenience, the bus bars to which the dinotes are assigned are also indicated.

The last note of a trinote is one of the twelve notes shown at the top of the table. Under the last note of a trinote and opposite the first two notes of said trinote (a dinote) there is a numeral showing the number of chances in sixteen there are that the last note of said trinote will follow said dinote. For example in FIGURE 9a, the first trinote tabulated is the trinote b d d. There are sixteen chances in sixteen (a certainty) that the note d will follow the dinote b d.

On the second line of the tablulation (FIGURE 9a) three trinotes are indicated, namely, c♯ d d, c♯ d e, and c♯ d A. Their probabilities are 5/16, 6/16, and 5/16, respectively. Specifically, there are five chances in sixteen that d will follow the sequence c♯ d, there are six chances in sixteen that e will follow the sequence c♯ d, and there are five chances in sixteen that the note A will follow the sequence c♯ d. On the third line, only one trinote is indicated, namely, the trinote d b d with a probability of 16/16, that is, sixteen chances in sixteen (a certainty) that note d will follow the dinote d b.

The way in which the trinote probabilities are determined and expressed in sixteenth's will be understood from the following example. Suppose there are three trinotes based on the dinote a b and it is found that these trinotes a b a, a b b, and a b c occur 7, 14, and 13 times, respectively. The total occurrences is 34. Thus there are 7 chances in 34 that the note a will follow the dinote a b. Expressed to the nearest sixteenths, there are three chances in sixteen that the note a will follow the dinote a b. The other trinote probabilities are determined similarly. In preparing the probability table of the present example, if the probability was closer to zero in sixteen than to one in sixteen, the probability one in sixteen was chosen.

Now consider the actual wiring of the probabilities into the decode switch (FIGURE 2) assuming that dinotes have been assigned to bus bars as explained in connection with FIGURE 8, and assuming that the decode relays have been connected to the note-actuating relays E-1, E-2, et cetera, also as explained in connection with FIGURE 8.

We may start with the first trinote b d d, the first two notes of which are the dinote b d assigned to bus bar No. 4. The chart shows that the probability is sixteen in sixteen that note d follows the note sequence b d. Therefore, all twelve decode switch contact points at the decode switch position 4 must be connected to another bus bar that, when grounded, will cause the note d to be sounded again. This also calls for a bus bar assigned the dinote d d, which is bus bar No. 6. Therefore, all contact points at position 4 are connected to bus bar No. 6. It will be remembered that while there are only twelve contact points, all sixteen output terminals of relay tree 68 (FIGURE 4) are connected to them by way of the decode switch wiper arms.

Next we may wire in the probabilities for the trinotes based on the dinote c♯ d assigned to bus bar No. 5. The trinote c♯ d d has the probability 5/16. Therefore, five contact points at position 5, each having a one in sixteen chance of being selected by the random unit, are connected the bus bar No. 6 which, when grounded, causes d to be sounded; and which also has been assigned the dinote d d. As shown in FIGURE 2, the first five contact points of position 5 are so connected.

The trinote c♯ d e has a probability of 6/16. The last three contact points at position 5, each having a two in sixteen chance of being selected, are connected to a bus bar that, when grounded, causes e to be sounded; and which also has been assigned the dinote d e. This is bus bar No. 11. The trinote c# d A has a 5/16 probability. Three contact points each having a one in sixteen probability of being selected and one contact point having a two in sixteen probability of being selected are connected to a bus bar which, when grounded, causes A to be sounded; and which also has been assigned the dinote d A. This is bus bar No. 26.

This procedure is continued until the probability wiring of the decode switch is completed. As a practical matter, the wiring connections preferably are tabulated as shown in the preceding decode switch wiring table by means of the trinote table of FIGURES 9a and 9b. Then the wiring table can be given to a wireman who will wire in the connections.

It should be understood that in the operation of the music composing machine it is not necessary that musical notes be sounded. For example, the decode relays may cause lamps to light which are representative of musical notes so that the notes can be read by sight.

RHYTHM CONTROL UNIT

Up to this point we have considered only the selection of successive notes without regard to sounding them in rhythm. Rhythm must be incorporated into the succession of notes in order to make a satisfactory melody. Some of the means of accomplishing this are:

(1) Obtain the sequence of notes only from the machine and arrange it in rhythmic form in a conventional way later.

(2) Supply a rhythm by actuating the machine in a rhythmic manner by the manual switch S—R.

(3) Supply a rhythm by a generator or rhythm control unit which produces variations in rhythm by random choice within a defined framework and along predetermined probabilities. The rhythm control unit actuates the machine automatically instead of by hand as in (2).

Of the methods described, each succeeding one becomes more automatic and capable of producing the result that requires less effort on the part of the operator. In (1) all the work on rhythm is done by the operator; in (2) the operator starts out with a rhythm and chooses from the result. In (3) the operator only needs to choose from the machine's output. After making the proper set-up the machine can carry on almost indefinitely.

In the example of the invention illustrated, a rhythm control unit 76 is provided. It is shown in block diagram in FIGURE 1b, and in more detail in FIGURE 5. It includes a random unit comprising a random switch 141, which may be the same as the random switch 67 shown in detail in FIGURE 3, and a relay tree 142. The relay tree 142, which is shown in detail in FIGURE 6, is the same as the relay tree 68 except that sixteen leads are taken off the sixteen contacts on the left side. Thus the single lead 143 may be connected through to any one of the sixteen leads. It will be apparent that other types of relay trees or the like may be employed, and that more or less than sixteen leads may be used.

The rhythm control unit further comprises a group of rotary switches that are rotated continuously by the motor 77. These switches are indicated generally in FIGURE 1b by a block 144. They are shown in detail in FIGURE 5 as a group of wafer switch sections 144a, 144b, 144c, and 144d for actuating the random switch 141; and a group of wafer switches 144A, 144B, 144C, 144D, 144E, and 144F which have their connections controlled in accordance with the operation of the random unit 141—142. The wafer switches of the latter group each function to provide a different rhythmic pattern when activated as a function of the random selection unit.

All the wafer switches have twelve contact point positions which are indicated as positions 1 to 12 going clockwise. Each switch has a wiper arm, shown at the center of the wafer, which is mechanically coupled to the motor 77 for rotation thereby as indicated by the broken lines.

Four pairs of leads from the random switch 141 are connected to the four wafer switch sections 144a, 144b, 144c, and 144d as illustrated in FIGURE 5 so that the two leads of each pair are connected together momentarily when the wiper arms of the switch sections are rotated through position 11. The five output leads 146, 147, 148, 149, and 151 are connected to the relay coils of relay tree 142 for actuating it as described in connection with relay tree 68. These connections into the relay tree are shown in FIGURE 6.

It has previously been explained that closing the manual switch S—R momentarily starts the cycle of operation of the system. When using the rhythm control unit 76 with the system, the switch S—R is left open and said unit connects leads 72 and 73 together periodically at rhythmic intervals by way of wafer sections 144A, 144B, et cetera.

Wafer section 144A has its position 1 contact point connected through lead 152 to the lead 72. The rotatable wiper arm is connected through lead 153 to the lead 73. It is apparent that each time the wiper arm of wafer 144A passes through position 1 it connects leads 72 and 73 together, thus starting the cycle of operation of the system to select and sound a note. In this way the rhythm control unit, in the specific example illustrated, causes a note to be sounded at the beginning of each measure of the musical composition.

At this point it may be noted that in the example of the invention being described the rotary stepping switch of the decode switch 66 is the element in the system that limits speed of operation. Therefore, the switches of the rhythm control unit must not be rotated so fast that said stepping switch does not have time to select the next note and step to the next position. It may be found desirable to operate the rhythm control unit at half the speed that would give directly the desired rhythm, at the same time having the octavers 61 and 62 (FIGURE 1a) each supply output signal one octave lower than the desired octave. The output of the composing machine can then be recorded, and later reproduced with the tape or other record driven at twice the speed used for recording.

Following the sounding of the first note of a measure, caused by the wafer 144A rotating through position 1, the time that the next note is sounded is determined by connections made through the relay tree 142 and one of the wafer sections 144B, 144C, 144D, 144E, and 144F. A note once sounded will continue to sound substantially until the next note is sounded. The sounding of one note actually is stopped an instant before the next note is sounded as is evident from the operation sequence that has previously been described.

FIGURE 5 shows connections for providing rhythm either in ¾ time or 4/4 time, depending upon the position of a switch 154. This switch connects the lead 73 either to a bus 156 for 4/4 time, or to a bus 157 for ¾ time.

For providing 4/4 time, certain contact points of wafers 144B, 144C, et cetera are connected to the bus 156. These contact points are those at position 7, wafer 144B; positions 4 and 10, wafer 144C; positions 7 and 10, wafer 144D; positions 4 and 7, wafer 144E; and positions 4 and 10, wafer 144F. The wiper arms of wafers 144B through 144F are connected, respectively, to leads 158, 159, 161, 162, and 163 which are connected to certain ones of the sixteen leads from relay tree 142.

These wiper arm connections to the relay tree leads may be made by means of a panel and jumper leads so that the connections may be readily changed when desired. For convenience in illustration, the sixteen relay tree leads are shown each connected to a pin in a block 164. The leads 158, 159, 161, 162, and 163 are shown connected to jacks in a block 166, certain of the jacks being connected together by jumper leads as illustrated. The pins of block 164 plug into the jacks of block 166 at the back side thereof.

Referring now to the above-described connections, it is apparent that if the random unit selects any one of the relay tree leads 5, 6, 7, or 8, the lead 158 will be connected through to the relay tree lead 143. In this case, as the wiper arm of wafer 144B rotates through position 7, the lead 73 is connected to the lead 72, thereby initiating a cycle of operation resulting in the selection and sounding of the next note. This connection from lead 73 to lead 72 may be traced from lead 73, through switch 154, bus 156, switch section 144B, lead 158, through one of the relay tree leads 5, 6, 7, or 8, the relay tree 142, and the relay tree lead 143 to the lead 72.

Since the lead 158 is connected to four of the sixteen relay tree leads, there are four chances in sixteen that the second note in the measure will be sounded when the wiper arm of wafer 144B goes through position 7.

As to the other wafer sections, their leads 159, 161, 162, and 163 are each connected to two relay tree leads It is immaterial what two relay tree leads they are since connection to any two will give the same probability (two chances in sixteen) that a particular wafer switch section will be connected through the relay tree 142 to the lead 143. It will be seen that in the example given there are four chances in sixteen that wafer 144B will determine the time of sounding a note following the first note in the measure, two chances in sixteen that wafer 144C will determine the time of sounding the notes in a measure following the first note of the measure, et cetera.

When rhythm in ¾ time is desired, the switch 154 is thrown to connect bus 157 to the lead 73. In the example illustrated for ¾ time certain contact points of wafers 144B, 144C, et cetera are connected to the bus 157 as follows: at wafer 144B, contact points at positions 5 and 9; at wafer 144C, contact point at position 9; at wafer 144D, contact point at position 9; at wafer 144E, contact point at position 5; at wafer 144F, contact point at position 5.

FIGURE 10 is a tabulation showing how the rhythm control unit functions both for ¼ time and ¾ time. The right-hand column shows the probability that a particular wafer switch section will be selected to control the system for one measure. For example, there are four chances in sixteen that wafer section 144B will be selected, there are two chances in sixteen that wafer section 144C will be selected, et cetera.

If the switch 154 is on the ¼ time position, the measure will contain two half notes if wafer 144B is selected, it will contain four quarter notes if wafer 144C is selected, et cetera.

Similarly, if the switch 154 is on the ¾ time position, the measure will contain three quarter notes if wafer 144B is selected, it will contain a half note followed by a quarter note if wafer 144C is selected, et cetera.

SYSTEM WITH DINOTE PROBABILITY

There are various embodiments of the invention that may be found useful. In applying the invention to music composition, it may be found desirable, in some cases, to design and wire a composing machine utilizing the probabilities for two note sequences (dinotes) rather than for trinotes.

FIGURE 11 shows a decode switch wired according to the dinote probability table of FIGURE 12. This decode switch may be substituted for the decode switch 66 of the system shown in FIGURES 1a and 1b. The operation of the system with this substitution is substantially the same as previously described, the difference being that a selected note always follows a certain single note instead of always following a certain two-note sequence. Because of this, the number of switch positions or settings required is less than in the trinote probability embodiment, specifically, there is one switch position for each note. In the present example, there are twelve available notes and, therefore, twelve switch positions.

The dinote probability table shown in FIGURE 12 was prepared from the same Stephen Foster songs as the trinote probability table of FIGURES 9a and 9b, and is read in the same manner. For example, there are sixteen chances in sixteen (a certainty) that note b will be followed by note d. Or, referring to note E, there are six chances in sixteen that it will be followed by note A, and ten chances in sixteen that it will be followed by note C#.

SYSTEM WITH PLURALITY OF DECODE SWITCHES

FIGURE 13 illustrates an embodiment of the invention employing a plurality of decode switches with associated switching circuits for the purpose of obtaining a more finished musical product.

It has been found that one can obtain closer results to a finished product by further tying-in the probabilities of the selection of any given note to the time, value and position in rhythm of that note.

It may be pointed out at this time that the more circumscribed, ordered and definitive the operation of the machine becomes, the greater will be the proportion of useful output, up to the point where the performance becomes too orderly and will begin to suffer in originality. The least ordered, that is purely random choice of notes, has the greatest number of possible variations but also the least and almost zero chance of any single choice being useable. As orderliness increases the possible variations decrease but the yield of useable choices increases until carried too far, at which point the variations possible become too small and the originality decreases. Statistical studies of the succession of notes and the relation to rhythm show that statistical tables based on such relation can be prepared for various types of music just as has been done for a succession of notes regardless of rhythm for certain songs. The statistical data of the succession of notes including the effect of rhythm can be incorporated in the machine by additional decode switches and relay switches operated by the rhythm control panel.

In FIGURE 13 the decode switch 66 (also indicated as decode switch A in FIGURE 13) is wired the same as previously described. The decode switches B and C are wired for the probability of succession where the probability depends in part upon the position of the note in the rhythmic structure. The decode switches B and C have different probability wirings based in part, respectively, upon a note occurring as the first note of a measure, and upon a note occurring as the first note of every fourth measure. The rhythm control unit, through relay switches, connects the respective decode switches into the system at proper intervals.

The system shown in FIGURE 13 is the same as that described in connection with FIGURES 1a and 1b except for the addition of the decode switch B and the decode switch C and the associated switching. Decode switch A may be a duplicate of the decode switch 66 of FIGURE 2 as to both structure and probability wiring. The decode switches B and C may each also be a duplicate of the decode switch 66 except that the decode relays are omitted (the decode relays of decode switch A being used) and the probability wiring is different. In FIGURE 13 only portions of the decode switches, are indicated since the structure, other than indicated above, is the same as that shown in FIGURE 2.

It will be noted that the homing level contacts of the several decode switches for each switch position are connected together so that all the decode switches are under the control of the decode relays of decode switch A. Also, the bus bars of the several decode switches for each switch position are connected together.

Relay switches 171 and 172 are provided for switching the desired decode switch into the system. This switching is controlled by the rhythm control unit 76 through relay control switches 173 and 174. Each of the switching relays 171 and 172 comprises twelve armatures, each armature having two contacts associated with it for switching twelve leads as indicated by legends. FIGURE 14 shows a single armature of each of the switches, and shows the switching for a single lead. The other eleven leads are switched simultaneously in a similar fashion. It will be seen that when relay 171 is energized, the probability wiring of decode switch B is switched into the system in place of the probability wiring of decode switch A. When both relays 171 and 172 are energized, it is the probability wiring of decode switch C that is switched in.

The rhythm control unit 76 is the same as shown in FIGURE 5, and it is assumed that the switches are the same position as shown in FIGURE 5. Specifically, the switch position is at the start of a measure. The contact arm 176 of switch 173 is driven in synchronism with the switches 144a, et cetera (FIGURE 5), and is shown at its position corresponding to the start of a measure. At this position the relay switch 171 is energized through a lead 175.

The switch arm 177 of the switch 174 is driven through gears at one-fourth the speed of the switches 173, 144a, et cetera. At the start of every fourth measure the relay switch 172 is energized through a lead 178.

It will now be apparent that in operating the system of FIGURE 13, the decode switch B with its particular probability wiring will be functioning during the selection of the first notes of the first three measures, and the decode switch C with its particular probability wiring will be functioning during the selection of the first note of the fourth measure. Selections of other notes of these four measures will be made while the decode switch A is functioning. This four-measure cycle of operation will repeat time after time as the composing machine continues to operate.

When the relay switches 171 and 172 are energized they should hold the newly selected decode switch connected into the circuit long enough to ensure a proper cycle of operation for a note selection. This cycle of operation is controlled by the control panel 71 (FIGURE 1a) as previously described. The decode switch will be held connected in the system long enough if it is switched in just before relay tree lead 69 is grounded at wafer switch 84 (FIGURE 1a) and is switched out just after ground in taken off lead 69. Such operation can be ensured by making the switch arms 176 and 177 (FIGURE 13) of the proper width.

As an example of how the probability wiring may differ in the several decode switches, consider a possible probability wiring for the decode switch C. In Stephen Foster music played in the key of D the note D is favored and, to a slightly less extent, the note above D and the note below D. Therefore, a probability table similar to that of FIGURES 9a and 9b is prepared but with the probability changed as to trinotes ending in D (either upper or lower octave) and also changed as to trinotes ending in the note above D or ending in the note below D. These changes are in favor of a greater probability that the note D and the notes above and below it will be sounded. For example, referring to FIGURE 9b, there are two chances in sixteen that d (lower octave) will follow G A, and four chances in sixteen that D (upper octave) will follow G A, while there are ten chances in sixteen that A will follow G A. For decode switch C this might be changed to six chances for d, six chances for D, and four chances for A. The same type of changes would be made for trinote probabilities. In some instances, where reasonable, a trinote ending in d or D might be added to the table where no such trinote appears in the table as shown in FIGURES 9a and 9b. The revised probabilities are then wired into the decode switch C.

As to the probability wiring for the decode switch B, in the manner discussed above emphasis may be put on selecting some particular note or notes for the first note of each measure. This may be desirable where a statistical study of certain music indicates that certain notes occur most frequently at the beginning of a measure.

Another example of an embodiment of the invention employing more than one decode switch is where a statistical study is made, for example, of a sequence of two quarter notes followed by a half note, and the probabilities thus determined wired into a decode switch D (not shown). Such a decode switch may be switched into the system of FIGURES 1a and 1b in response to the rhythm control unit calling for half notes. As to the probabilities determined by said statistical study, it is apparent that for a given trinote, the probability figured on like value notes, as was done for the table of FIGURES 9a and 9b, will be different than the probability figured on different value notes, as for example, figured on two-quarter notes followed by a half note. In the embodiment now being described, the two decode switches A and D are wired according to these different probabilities. One or the other of these decode switches is switched into the system through a relay switch like the relay switch 172 of FIGURE 13, for example. This relay switch is energized in response to the rhythm control unit calling for a half note.

FIGURE 15 shows how a switching circuit can be added to the rhythm control unit of FIGURE 5 for switching in the decode switch D when a half note is called for. This example is for the case of 4/4 time. The same kind of circuit can be added for 3/4 time.

As shown schematically in FIGURE 15, the wafer switches 144A through 144F have associated with them, respectively, additional wafer switches 144A' through 144F'. Wafer switches 144A and 144A' are not shown in FIG. 15. The contact arms of all these switches are rotated together as indicated by the broken lines. The contact arm of switch 144B', for example, is on the same shaft as the contact arm of switch 144B.

The wafer switches 144B' through 144F' complete a circuit through a relay coil 181 each time one of the switches 144B through 144F calls for a half note. For example, if the rhythm control unit selects switch 144E, when the contact arm of switch 144E rotates 180 degrees from the position shown, a half note is called for; at the switch 144E' there is a contact at this 180 degree position through which a circuit is completed to energize the relay coil 181. This results in the decode switch D (not shown) being switched into the system so that the note selection is based on probabilities involving half notes as previously described. It will be understood that the relay coil 181 is the one that actuates a relay switch similar to the relay switch 172 (FIGURE 13) for switching relay tree leads from one decode switch to another decode switch.

As another example, assume that the switch 144D is selected in the rhythm control unit. In this case a half note is called for when the switch arm of 144D is in the position shown, it being noted that wafer switch 144A (FIGURE 5) always calls for a note at the start of a measure. Therefore, the relay coil 181 is energized through switch 144D' when the switches are in the positions shown. It will be recalled that when wafer switch 144D is selected, the lead 161 is connected through the relay tree 142 (FIGURE 5) to ground.

It may be mentioned that in composing music it may be desirable in some cases to replace the rhythm control unit by a driven roll of paper punched according to the desired rhythm, associated contacts completing a circuit when a hole runs under a contact. This is a desirable procedure, for instance, in the solution of a problem where rhythm is given and music to fit the rhythm is wanted. In such a case suitable connections can be made by the proper holes punched in the paper roll to call for the selection of a proper decode switch in accordance with note time value or position in a measure or both.

SYSTEM WITH ELECTRONIC DECODE SWITCH

In the embodiments of the invention heretofore described, the system employs mechanical switching in the decode switch. Instead of mechanical switching, electronic switching with vacuum tubes or the like may be employed. Such switching makes faster operation possible, particularly at the decode switch. A system employing electronic switching is illustrated in FIGURES 16, 17, 18, 19, 20, and 21.

FIGURE 16 is a block and circuit diagram of an embodiment of the invention wherein the decode switch comprises the thermionic tube amplifiers X, and additional thermionic tube units Y and Z. The details of units X, Y, and Z are shown in FIGURE 17.

The amplifier units X correspond in function to the contact points of the stepper switch embodiment shown in FIGURE 2. There are fifty rows of the units X, just as there are fifty positions of the stepper switch of FIGURE 2. Each row is a switch position or switch setting. Each row includes sixteen of the units X. There are sixteen instead of twelve (there being twelve contact points for each position in FIGURE 2) because sixteen leads are taken from the relay tree. The present arrangement could just as well be the same as the one previously described where twelve leads are taken off the relay tree (FIGURE 4) as a result of certain pairs of relay tree leads being connected together.

Referring to the overall system shown in FIGURE 16, it will be evident that like the system illustrated in FIGURE 1a, it comprises a control panel, a random switch, a relay tree, and a decode switch, indicated respectively in FIGURE 16 at 210, 211, 212, and 213. In the case of electronic switching it is advantageous to control the system by alternating current instead of by direct current. Therefore, an oscillator 214 is employed for supplying a control signal having a frequency that is above audibility.

Assuming the system of FIGURE 16 is to be set up the same as previously described to produce Stephen Foster type music, the blocks carrying the legend source may be tone sources providing the twelve notes represented in FIGURE 7. In the example illustrated, there is a separate source for each note.

The amplifiers 216 (shown in detail in FIGURE 21) are normally blocked by a negative bias. They pass the source signal when the voltage on the control lead 217 from the unit Z becomes less negative. This source signal, a note in the example assumed, may then be fed through the conductors 218 to an amplifier 219 and a loud speaker 221.

Before describing the decode switch 213 and its operation, the associated units will be described. The amplifier units 216 are shown in FIGURE 21. Each amplifier 216 is merely a push-pull amplifier that is normally biased beyond cut-off by a negative voltage on the lead 217. A filter comprising a resistor 222 and a capacitor 223 may be provided for controlling the time of rise and fall of the tone carrier passed by the amplifier. That is, the filter 222—223 is for envelope shaping. There are various other amplifiers that are suitable for use in the system.

The random switch 211, shown in detail in FIGURE 18, is the same in circuit and in operation as random switch 67 previously described, except that the output connections are different since it is to work into a tube relay tree. It will be noted that in random switch 67 (FIGURE 3) the bistable multivibrator feeds into an output tube and a load balance tube. Both of these tubes are omitted in the circuit of FIGURE 18. Furthermore, the positive side of the +B or plate supply is connected to the common or ground lead 220.

The output leads 224, 226, 227, and 228 are each taken off the anode of the second tube 229 of the bistable multivibrator. It will be noted that anode voltage is applied to the first tube 231 and the second tube 229 of the bistable multivibrator through the common resistor R1 and through the resistors R2 and R3, respectively.

If, in making a random selection, the second tube 229 of the bistable multivibrator is left conducting, then tube current flows through R1 and R3 and the output lead (224, for example) is negative a maximum amount with respect to the common lead 220. If, on the other hand, the first tube 231 is left conducting, then there is no current flow through R3 and said output lead is negative a less amount with respect to the common lead. It is under this condition that a tube of the tube relay tree is opened to pass signal as will be evident from the following description of said relay tree.

Refer now to the tube relay tree shown in FIGURE 19. Each relay unit, represented by a block, comprises the circuit shown in FIGURE 20. Each relay unit has an input terminal 1 and two output terminals 3 and 4. Control bias is applied to the terminal 2. The control signal from oscillator 214 (FIGURE 16) appears on either terminal 3 or terminal 4 depending upon the negative bias applied to the terminal 2. Not counting the common lead 220, the relay tree has one input lead 232 and sixteen output leads. It is evident that the output lead on which the oscillator signal appears will depend upon the particular combination of control leads 224, 226, 227, and 228 that are left in the minimum negative condition by the random switch.

FIGURE 20 shows the circuit for each of the fifteen blocks or relay units shown in FIGURE 19. The specific illustration in FIGURE 20 is for the first or input block of FIGURE 19. Each relay unit comprises vacuum tubes 233 and 234 which may be supplied with suitable operating voltages from a voltage source such as the battery 236. This voltage source may be common to all the relay units as indicated in FIGURE 19.

Positive voltage is applied to the anode of the tube 233 through resistors 237 and 238 in series. Oscillator signal is applied to the control grid of tube 233 through the lead 232 and a coupling capacitor 239. Said control grid has negative bias applied thereto through a resistor 241 by way of a control lead from the random switch, this being lead 228 in the illustration. The tube is either biased beyond plate current cut-off or is biased for amplifier operation to pass signal, depending upon the bias left on the lead 228 by the random switch.

The cathode of tube 234 is operated above the ground or common lead potential, and thus above the cathode potential of tube 233. Specifically, the cathode of tube 234 is connected through a cathode biasing resistor 242 to the 150 volt terminal of the power supply. The anode of tube 234 is connected through plate resistors 243 and 244 to the 300 volt terminal of the power supply. An output lead and a blocking capacitor 245 connect the junction point of the plate resistors 243 and 244 to the output terminal 4.

The anode circuit of tube 233 is direct current coupled from the tube anode through a resistor 246 to the grid of tube 234. The adjustment is such that if tube 233 is in amplifying condition, the anode current through resistors 237 and 238 applies enough negative bias to the tube 234 to bias it beyond cut-off. When tube 233 is biased beyond cut-off, the tube 234 is properly biased for amplifier operation to pass signal.

Oscillator signal will appear on output terminal 4 if the control bias on lead 228 is such as to block tube 233. In this case the oscillator signal applied to terminal 1 passes over a lead 247, through a coupling capacitor 248 to the grid of tube 234, and through tube 234 to terminal 4.

Oscillator signal will appear on output terminal 3 if the control bias on lead 228 is insufficient to block tube 233. In this case the oscillator signal applied to terminal 1 is passed by the tube 233 (tube 234 being blocked), and is supplied from the junction point of plate resistors 237 and 238 over a lead 249 and through a coupling capacitor 251 to the output terminal 3.

THE ELECTRONIC DECODE SWITCH

Circuit details of the electronic decode switch 213 are shown in FIGURE 17. To simplify the drawing, only two rows of switch units are shown although there are fifty rows in the present example. One row is the units X, Y, and Z associated with the bus 1. The other row is the units X, Y, and Z associated with the bus 4. To further simplify the drawing, only two units X are shown in each row although there are sixteen units X in each row in the present example. The X, Y, and Z units in one row are the same as those in the other rows.

Each unit X is an amplifier comprising a vacuum tube 252 that is normally biased beyond cut-off by the application of a negative voltage from a lead 253. This is the condition when the vapor or gas tube 254 of the associated unit Y is not conducting. This biasing circuit may be traced from the common or ground side of the C battery in unit Y, through the C battery, a lead 256, a cathode resistor 257, and through the lead 253 to the grids of the X unit tubes.

Referring to both FIGURE 16 and FIGURE 17, it will be seen that signal from the oscillator 214 is applied to the grid of the tube in a particular unit X in all fifty rows in accordance with the random switch selection. More specifically, during one operation sequence or cycle of the control panel switches (FIGURE 1) oscillator signal will appear on one of the sixteen output leads of the relay tree 212. This may be, for instance, the lead indicated at 258 in FIGURES 16 and 17.

Also it will be noted that the output circuits of certain X unit tubes are connected to a common conductor such as 259 (FIGURE 17). This corresponds to connecting certain contact points together as is done in the mechanical switch example of FIGURE 2. Thus the number of chances in sixteen that oscillator signal will appear on the common conductor such as 259 (assuming the tubes of X units have been unblocked) depends on the number of X unit outputs that are connected to the common conductor.

The output circuits of one or more X units are connected to certain buses. For example, in FIGURE 17 the X unit common output conductor 259 is connected through a lead 261 to the bus 4. Similarly, the connection to the bus 1 is from the X unit in column 2, row 7, as indicated by the legend.

From the foregoing it will be evident that the probabilities are wired into the electronic decode switch in the same way they are wired into the mechanical decode switch of FIGURE 2. It is assumed in the present example that the wiring is in accordance with the same trinote probability table used in wiring the switch of FIGURE 2.

Referring again to FIGURE 17, assume that in unit Y of row 1 a switch 262 is closed momentarily so that the tube 254 fires. It is assumed that the control panel switches are in position 1 as shown in FIGURE 16. Now current flow through cathode resistor 257 lowers the negative bias on the lead 253 and all the tubes of the X units in row 1 are put in condition to pass oscillator signal. If the control panel switches are now stepped through a cycle of operation, oscillator signal will momentarily be applied through the relay tree to all of the X units in a particular column and therefore to one of the X units in a particular row. Assume that oscillator signal is applied to the lead 258. Since tube 252 has been unblocked, oscillator signal is fed to bus 4 and to unit Y of row 4.

The oscillator signal on bus 4 is amplified by a vacuum tube 263 and then rectified by a voltage doubler comprising a diode section 264 so that a positive potential appears at the cathode end of the cathode resistor 266 and its shunting capacitor 267. The diode section 268 prevents a charge from building up on the coupling capacitor 269.

The resulting positive potential rise at the cathode end of resistor 266 causes a vapor or gas tube 271 to fire. At this time the control panel switches are still in a position that connects the Y unit terminals 2 and 3 together, and terminals 4 and 5 together. Up to this time the vapor tube 254' was nonconducting since the connection to the grid of tube 254' through a capacitor 272 is an alternating-current connection. When tube 271 fires, the tube 254' still remains nonconducting since its grid was driven in the negative direction as a result of the voltage drop in the anode resistor 270.

At a later point in the cycle of operation the connection between terminals 2 and 3 of unit Y are broken momentarily, thus taking anode voltage off vapor tube 271 and extinguishing it. This causes the potential at the anode of tube 271 to go more positive since there is now no voltage drop in resistor 270, the rising voltage is passed through coupling capacitor 271 to make the grid of tube 254' more positive, and the tube 254' fires.

When tube 254' fires, the X units of row 4 are enabled, that is, unblocked so they can pass oscillator signal. Previously in the cycle of operation the vapor tube 254 of row 1 was extinguished, thus blocking the X units of row 1.

The X units of row 4 have now been put in condition to pass oscillator signal to a bus in another row. Which bus this is depends upon the relay tree output lead selected by the random switch and upon the decode switch probability wiring.

Referring now to the actual sounding of the notes, a note is sounded each time the last vapor tube of the unit Y is fired. For example, while the vapor tube 254 was conducting, the unit Z was conditioned to hold the output terminal 4 of unit Z positive (or negative a minimum amount). This opens the amplifier 216 (FIGURES 16 and 21) so that the note supplied by the source 273 (FIGURE 16) is passed to the output line and to the output amplifier 219.

The unit Z, referring to row 1 for example, comprises an amplifier tube 274 that has its grid direct current coupled to the cathode resistor of vapor tube 254. The C battery in unit Y holds tube 274 blocked until tube 254 fires. When it fires, signal from the oscillator 214 (FIGURE 16) is fed from the lead 276, through a coupling capacitor, and through the tube 274 to a rectifier circuit comprising a pair of diodes 277. This rectifier circuit operates the same as the one in the unit Y. Rectification of the oscillator signal causes the cathode end of a resistor 278 to go in the positive direction and unblock the envelope amplifier 216 so that a note is sounded.

In the example that has been assumed, after tube 254 has been extinguished and the sounding of the corresponding note stopped, the tube 254' in row 4 is next fired. This results in amplifier 216 in row 4 being unblocked so as to pass the note from source 273' (FIGURE 16).

As previously indicated, to start the system in operation when it comprises the electronic decoder switch, it is necessary first to fire one the last vapor tube of the Y unit. In the example illustrated, this is done by closing a switch 262 and thereby connecting the positive terminal of a battery 279 to the grid of the vapor tube 254 through the grid resistor. If desired, a corresponding switch and battery may be provided for each of the units Y so that when the system starts operating, the first note sounded may be any one of the notes that the operator selects.

With the foregoing description in mind, the full cycle of operation of the system shown in FIGURE 16 can now be described. First, it should be noted that the control panel with its eight rotary switch sections corresponds in general to the control panel shown in FIG- URE 1a. There are certain differences in the switching that will be apparent. However, the eight switch sections are stepped around from a homing position back to the homing position, just as in FIGURE 1a, in response to the rhythm control unit momentarily connecting together the leads 281 and 282. Also while seven switch positions are illustrated for convenience in description, the five switch sections on the left function exactly the same as the switch sections in FIGURE 1a having corresponding functions. These switches in FIGURE 1a with corresponding functions are the four right-hand switch sections 91 to 94 and the left-hand switch section 78.

It will also be understood that the random switch 211 and relay tree 212 function exactly the same as the corresponding units 67 and 68 in FIGURE 1a. If desired, they may be the same in construction as units 67 and 68.

Let us now follow through one cycle of operation, referring to FIGURES 16 and 17. Assume the control panel switches are on the homing position as shown. This is referred to as position 1. Now the last vapor tube of a unit Y is fired as by closing a switch 262 (FIGURE 17) momentarily. Next the rhythm control unit is started, or the leads 281 and 282 are otherwise momentarily connected together.

The stepping relay steps the control panel switches to position 2. As a result the pairs of leads going to the random switch 211 are opened and the switch 211 selects an output lead of the relay tree 212. This selection is not yet made known to the decode switch 213. It has been assumed that in row 1 of the decode switch the X units have been enabled by firing the last vapor tube of the Y unit. The note supplied from source 273 is, of course, sounding at this time.

In all other rows of the decode switch there is no vapor tube that is fired, and in all other rows all X units are blocked and all Z units are blocked.

The control panel switches next step to position 3. At the switch section 283 leads 284 and 286 are connected together so that signal from oscillator 214 is supplied to the relay tree 212 while the control panel switches are in position 3. Assume that relay tree lead 258 was selected by the random switch. Then oscillator signal passes through an X unit of row 1 and through the conductor 261 to the bus 4 of row 4. This fires the first vapor tube 271 in unit Y of row 4. Nothing further happens at this time.

At position 4 the oscillator signal circuit to the relay tree has been broken so that oscillator signal is no longer applied to the decode switch. Nothing happens as a result of this. The first vapor tube 271 (FIGURE 17) in unit Y, row 4 remains fired.

It should be noted that during the operation cycle so far described the pair of leads 287, 288 and the pair 289, 291 are each connected together at the switch sections 292 and 293, respectively. Thus the anode voltage supply circuits to the vapor tubes of the units Y are closed and applying operating voltage to the vapor tubes.

At position 5 the switch section 293 breaks the connection between leads 289 and 291, thus removing anode voltage from the second vapor tube (254 in row 1) in all the Y units. This extinguishes the tube 254 and the note supplied from source 273 stops sounding. Nothing further happens at position 5.

At position 6 the anode voltage supply circuits to the last vapor tubes of the units Y are again completed at switch section 293. None of these tubes is fired, however, at this time.

At position 7 the connection between leads 287 and 288 is broken at switch section 292 to thereby take anode voltage off all of the first vapor tubes of the Y units. In this instance, it is the vapor tube 271 in unit Y of row 4 that previously was fired. It is now extinguished. The result is that the last vapor tube 254' of unit Y, row 4, is fired. This causes the following to happen:

(1) Unit Z of row 4 is unblocked and the note supplied from source 273' is sounded.

(2) The X units of row 4 are now enabled so that they may pass oscillator signal when it is applied to them.

The control panel switches are next stepped to their homing position 1. The following now happens:

(1) The control panel switches stop stepping around.

(2) The pairs of leads from the random switch 211 are again connected together so that the bistable multivibrators therein are again being driven.

(3) At switch section 292 the anode voltage supply circuit for the first vapor tubes of the Y units is again completed.

The system is now back to the same condition as when it previously was on position 1. However, now it is the last vapor tube of unit Y in row 4 that is fired, and it is the X units in row 4 that are enabled. The next time the leads 281 and 282 are momentarily connected together, the cycle is repeated. This time when control panel switch position 3 is reached, the oscillator signal passes through one of the X units in row 4 and is applied to another bus, such as the bus 6, depending upon the probability wiring. The operation sequence is the same as previously described.

While the invention has been described specifically with respect to the composing of music, for which purpose the invention is particularly adapted, the invention is not limited to this particular use. The invention is of general application to any field wherein the probability of a certain event occurring depends on the kind of event or events that preceded, and wherein the probability is known at least approximately or is assumed.

An example of a use where the probability is assumed is in the musical composing field where probability tables may be prepared by a person with experience in this field, but where they are not prepared from actual musical compositions. Also, probability tables might be prepared from musical compositions, and then changed more or less arbitrarily to obtain better or different results.

What is claimed is:

1. Apparatus for use in formulating an event sequence including a plurality of events comprising a plurality of output means each representing a different one of said events and including sources, a random selection device, and decoding switch means operatively associated with said random selection device, said random selection device and said decoding switch means being operatively associated with said output means.

2. Apparatus for use in formulating an event sequence including a plurality of events comprising a plurality of signal sources each of which represents a different one of said events, said sources having output means operatively associated therewith, a random selection device, and decoding switch means operatively associated with said random selection device, said decoding switch means being operatively associated with said output means.

3. Apparatus for formulating the choice of and for choosing an event from events which can possibly follow each other in sequence comprising a plurality of output means representing said events and including sources, a random selection device, and selector means operatively associated with said random selection device for selecting an event in accordance with a predetermined probability dependent upon occurrence of a preceding event that said selected event will follow said preceding event, said selector means being operatively associated with said output means for operating the one of said output means representing said selected event.

4. A composing device for use in formulating musical compositions and the like comprising a plurality of sources of signals representing musical tones or the like, said sources having output means operatively associated therewith, a random selection device, and decoding switch means operatively associated with said random selection device, said random selection device and said decoding switch means being operatively associated with said output means.

5. In apparatus for use in choosing an event from events which can possibly follow each other, the combination comprising output means for choosing a first of said events and including sources, selector means for establishing the choice of the next of said events in accordance with a predetermined probability dependent upon the occurrence of said first event that the next event will follow said first event that preceded it, and a random selection device operatively associated with said selector means, said selector means being also operatively associated with said output means.

6. In apparatus for use in making selections of events from a plurality of events, the combination comprising a random selection device, selector means operatively associated with said random selection device for establishing a plurality of choices among said plurality of events in accordance with a predetermined probability dependent upon occurrence of preceding events that a selected event will follow a certain plurality of events occurring in a certain sequence that preceded it, output means operatively associated with said selector means for choosing a first of said events and including sources, said selector means being operatively associated with said output means for selecting one of said events next succeeding said certain plurality of events at random in accordance with said probability, and other output means coupled to said selector means for choosing said next succeeding event.

7. In apparatus for choosing events from a plurality of events one of which can possibly follow another, the combination comprising output means for choosing from among certain of said events a first of said events, and an event next succeeding said first event and including sources, a selector device operatively associated with said output means providing a choice from among said certain events in accordance with a predetermined probability dependent upon occurrence of preceding events that each of said plurality of events will follow a certain group of events that preceded it, a random selection device operatively associated with said selector device for operating said selector device to choose said next succeeding event from among said certain events, and indicator means included in said output means for indicating said chosen event.

8. Apparatus for choosing events which can possibly follow one another in occurrence comprising first output means for choosing a first of said events, first selector means operatively associated with said first output means for establishing the choice of a second of said events next succeeding said first event based upon a predetermined probability dependent upon occurrence of preceding events that said second event will follow a certain group of said events including said first event that preceded said second event, second output means operatively associated with said first selector means for choosing said second event, said apparatus further comprising second selector means operatively associated with said first selector means and said second output means for establishing the choice of a third of said events based upon a predetermined probability dependent upon occurrence of preceding events that said third event will follow a certain group of events that preceded said third event, third output means operatively associated with said second selector means for choosing said third event, said last-named group of events including said first and second events, said output means all including sources, and indicator means included in said first, second and third output means for indicating the events that are chosen.

9. Apparatus for sequentially selecting events comprising random selection means, a plurality of sources, switching means operatively associated with said sources and including said random selection means for choosing an event with a predetermined probability dependent upon occurrence of preceding events that said event will follow a certain group of events that preceded it, and said apparatus further comprising further switching means operatively associated with said sources and first named switching means and also included in said random selection means for next again choosing an event in accordance with a predetermined probability dependent upon occurrence of a preceding event that said next chosen event will follow a certain group of events that preceded it, said last mentioned group of events including as the last event therein the first mentioned chosen event.

10. Apparatus for choosing events in accordance with a predetermined probability dependent upon occurrence of preceding events that each of said events will follow a preceding group of events, said apparatus comprising switching means operative to provide a plurality of different selections each a function of the probability that each of said different selections will follow a preceding sequence of selections, random selection means operatively coupled to said switching means for making one of said plurality of selections at random and thereupon operating said switching means, and output means operatively associated with said switching means for choosing said events in response to said selections, said output means including sources.

11. Apparatus for choosing events successively in accordance with a predetermined probability that certain events will follow a certain group of events which preceded them, which apparatus comprises a plurality of output means for choosing at least one of said events and including sources, a matrix coupled to said output means for establishing a plurality of paths to said output means in accordance with said predetermined probability, switching means operatively associated with said matrix for successively actuating selected ones of said plurality of output means through said paths, and a random selection device operatively associated with said switching means for selecting at least one of said paths at random.

12. Apparatus for choosing events in accordance with a predetermined probability dependent upon occurrence of preceding events that certain events will follow certain other events which preceded them, which apparatus comprises a matrix having a plurality of inputs and a plurality of outputs, said inputs being arranged in groups and said outputs constituting at least one group, said inputs in each of said input groups being connected to different outputs in accordance with said predetermined probability, circuit means included in said matrix for actuating at least one of said outputs upon actuation of at least one of said inputs so that said one output will be actuated following actuation of certain other outputs of said group of outputs, a random selection device coupled to said inputs for actuating at least one of said inputs at random, and a plurality of output means including sources and coupled to said outputs and corresponding to different ones of said events, said plurality of output means being individually operable upon actuation of said outputs for selecting said events.

13. Apparatus for choosing events successively in accordance with predetermined probabilities dependent upon occurrence of preceding events that certain events will follow a certain group of events which preceded them, which apparatus comprises a matrix having a plurality of inputs and a plurality of outputs, a plurality of circuit paths arranged in said matrix between said inputs and said outputs in accordance with said predetermined probability that certain of said outputs will be actuated following actuation of a group of other of said outputs, a random selection device coupled to said inputs for actuating at least one of said inputs at random, and a plurality of output means including sources and coupled to said outputs and each corresponding to a different one of said events and operable upon actuation of said outputs to select said events.

14. Apparatus comprising a switching device having a plurality of selectable switch settings and having a plurality of input leads, signal applying means coupled to said leads for applying signals to said leads, signal responsive devices corresponding to said switch settings and operatively associated with said switch settings, selector means operatively associated with said input leads for selecting with a predetermined probability dependent upon a selected preceding switch setting a signal responsive device which corresponds to one of said plurality of switch settings, switch means including at least one of said input leads for next switching all said input leads to said one switch setting, and further switch means operatively associated with said one input lead for repeating the above-specified cycle of operation by again selecting with a predetermined probability dependent upon the selection of said one switch setting a signal responsive device for a succeeding switch setting, and by again switching all said input leads to the switch setting of the last selected signal responsive device.

15. A device for providing rhythm comprising a plurality of rhythm sources, each of which provides a different rhythmic pattern when activated, and switching means operatively associated with said rhythm sources for activating said rhythm sources with a predetermined probability, said last means including a random selection device.

16. In music composing apparatus, a rhythm utilization circuit, a rhythm control device coupled to said circuit for actuating said circuit during successive measures of the music, said device comprising a plurality of switching means each operatively associated with said circuit, each of said switching means being operative to actuate said circuit with a different rhythmic pattern when activated, and further switching means operatively associated with said first named switching means for activating with a predetermined probability said first named switching means, said last means including a random selection device.

17. In music composing apparatus, a rhythm utilization circuit, a rhythm control device for actuating said circuit during successive measures of the music, said device comprising switch means operatively assoicated with said circuit for actuating said circuit at a certain time in each successive measure, said device further comprising a plurality of further switch means coupled to said first named switch means, for actuating said circuit with a different rhythmic pattern when activated, and rhythm selector means operatively associated with said further switch means for activating with a predetermined probability said plurality of further switch means, said rhythm selector means including a random selection device.

18. Apparatus for choosing an event from a plurality of events which can possibly follow each other comprising means for choosing and indicating an event in accordance with a predetermined probability that it will follow a certain group of events that preceded it, said means including a matrix having a plurality of inputs and a plurality of outputs, each of said outputs corresponding to a different one of said events, said matrix having a plurality of paths between said inputs and individual ones of said outputs, means for selecting said paths in sequence in accordance with a predetermined probability that one of said events will follow a certain group of said events which preceded it, and a random selection device, said random selection device comprising a plurality of switching devices each having on and off positions, a plurality of driving means for driving, respectively, said switching devices to on and off positions and for then leaving said switching devices randomly in either an on or off position, a switching circuit having an input lead and a plurality of output leads and comprising means for connecting said input lead to a selected one of said output leads as a function of the operation of the switching devices, and means for connecting said output leads separately to said inputs of said matrix.

19. In combination, a switching device having a plurality of input circuits, said switching device having a plurality of switch settings, signal responsive devices for each of said switch settings, means for switching said input circuits from one switch setting to a succeeding switch setting, selecting means including random switching means for selecting with a predetermined probability the signal responsive device for a succeeding switch setting, said selecting means including a circuit that is completed through at least one of said input circuits and through a portion of said switching device at a preceding switch setting, said portion being connected to the switch setting for said selected signal responsive device in accordance with said predetermined probability, means for next swiching said input circuits from said preceding switch setting to the switch setting for said selected signal responsive device, and means for successively repeating the above-specified cycle of operation.

20. In combination, a switching device having a plurality of input circuits, said switching device having a plurality of switch settings, said switching device also having a plurality of switch portions in each of said switch settings, signal responsive devices for each of said switch settings, means for switching said input circuits from one switch setting to a succeeding switch setting, selecting means including random switching means for selecting with a predetermined probability the signal responsive device for a succeeding switch setting, holding means for holding said selection, said selecting means including a circuit that is completed through at least one of said input circuits and through at least one of said plurality of switch portions of said switching device at a preceding switch setting, said portions being connected to said switch settings in accordance with said predetermined probabilities, means for next switching said input circuits from said preceding switch setting to the switch setting for said selected signal responsive device, said last means including means for releasing said holding means, and means for successively repeating the above-specified cycle of operation.

21. In combination, a switching device having a plurality of multiple circuit switch settings and having a plurality of input leads, said switching device further comprising means for switching said input leads successively from one switch setting to another switch setting, signal responsive devices cooperating with said switching device at each of said switch settings, selecting means including random switching means for selecting with a predetermined probability a signal responsive device at a switch setting other than the one to which said input leads are switched, said selecting means including a circuit that is completed through at least one of said input leads and through at least one of the circuits of the switch setting to which said leads are switched, certain of said last mentioned circuits being connected to said other switch setting in accordance with said predetermined probability, means for next switching said input leads to the switch setting of said selected signal responsive device, and means for repeating the above-specified cycle of operation by again selecting with a predetermined probability a signal responsive device associated with a switch setting other than the one to which said input leads are switched, and by again switching said input leads to the switch setting with which the last selected signal responsive device is associated.

22. In combination, a switching device having a plurality of multiple contact switch positions and having a plurality of input leads, said switching device further comprising means for switching said input leads successively from one switch position to a succeeding switch position, relays located at each of said switch positions, selecting means including random switching means for selecting and energizing with a predetermined probability a relay at a switch position succeeding the switch position to which said leads are switched, said selecting means including a plurality of circuits each individually connected between certain contacts of said switching device at different ones of said switch positions in accordance with said predetermined probability, at least one of said circuits being completed through at least one of said input leads and through at least one of the contacts of the switch position to which said leads are switched, means for next switching said input leads to the switch position at which said selected and energized relay is located, and means for repeating the above-specified cycle of operation by again selecting and energizing with a predetermined probability a relay associated with a succeeding switch position, and by again switching said input leads to the switch position with which the last selected and energized relay is associated.

23. In combination, a random swich and a decode stepping switch having a plurality of wiper arms and a plurality of contact points at each decode switch position, means for stepping said decode switch arms successively from one switch position to the next switch position, said decode switch having a plurality of input leads connected respectively to said wiper arms, a plurality of decode relays, there being one of said decode relays at each of said decode switch positions, means for indicating a certain event in response to energization of a certain decode relay, the contact points of each decode switch position being connected in accordance with predetermined grouping of contacts to at least one of the decode relays at succeeding switch positions to provide an energizing circuit for said decode relays, means comprising said random switch for randomly selecting at least one of said input leads, means for next de-energizing and releasing the decode relay at the decode switch position on which said wiper arms rest, means for next completing a circuit through said selected input lead and thereby energizing a certain one of said decode relays at a succeeding switch position, means for substantially simultaneously locking said energized decode relay in its energized position, means for indicating a certain event in response to said energization and locking of said certain one decode relay, means for next breaking said circuit through said selected input lead to prevent energizing of any other decode relays until a circuit through a selected input lead is again closed, means for putting said random switch in condition to make another random selection, means for next stepping said wiper arms to the decode switch position of said last energized decode relay and stopping them on that position, and means for again randomly selecting at least one of said input leads and repeating the above-described cycle of operation.

24. A music composing machine comprising a switching device having a plurality of switch settings and having a plurality of input leads, signal responsive devices representative of musical notes for said switch settings, means for selecting with a predetermined probability a signal responsive device for a certain switch setting, said probability being the probability that a certain note will follow a certain group of events, means for next switching said input leads to said certain switch setting, and means for repeating the above-specified cycle of operation by again selecting with a predetermined probability a signal responsive device for a certain switch setting, said last probability being the probability that a certain note will follow a certain group of events that include the preceding selection of a certain signal responsive device, and by again switching said input leads to the switch setting of the last selected signal responsive device, said selecting means including a random selection device.

25. A music composing machine comprising a switching device having a plurality of switch settings and having a plurality of input leads, signal responsive devices representative of musical notes located respectively at said switch settings, means for selecting with a predetermined probability a signal responsive device at a certain switch setting, said probability being the probability that a certain note will follow a certain group of events, means for next switching said input leads to said certain switch setting, and means for repeating the above-specified cycle of operation by again selecting with a predetermined probability a signal responsive device at a certain switch setting, said last probability being the probability that a certain note will follow a certain group of events that include the preceding selection of a certain signal responsive device, and by again switching said input leads to the switch setting at which the last selected signal responsive device is located, said selecting means including a random selection device, and rhythm control means for causing said signal responsive devices to be selected in rhythm, said rhythm control means including another random selection device.

26. A music composing machine comprising means including random selection means for choosing a musical note with a predetermined probability that said note will follow a certain group of notes that preceded it, said apparatus further comprising means including said random selection means for next again choosing a musical note in accordance with a predetermined probability that next chosen note will follow a certain group of notes that preceded it, said last-mentioned group of notes including as the last note in the group the note that was previously chosen.

27. A music composing machine comprising means including random selection means for choosing a musical note with a predetermined probability that said note will follow a certain group of events that preceded it, said apparatus further comprising means including said random selection means for next again choosing a musical note in accordance with a predetermined probability that said last-mentioned note will follow a certain group of events that include the preceding selection of said first-mentioned musical note, means for indicating the notes that are chosen, and rhythm control means for causing said musical notes to be chosen in rhythm, said rhythm control means including another random selection device.

28. A random selection device comprising a plurality of oscillators, a plurality of switching devices each having on and off positions, switch means for coupling said oscillators to said switching devices, respectively, to drive said switching devices and for then breaking said coupling whereby each of said switching devices is left randomly in either an on or off position, a switching circuit operatively coupled to said switching devices having an input lead and a plurality of output leads and comprising means for connecting said input lead to a selected one of said output leads as a function of the operation of the switching devices.

29. The invention according to claim 28, wherein said oscillators each operate at a different frequency, and wherein said frequencies are high compared with the rate at which said couplings are broken.

30. A device for providing rhythm comprising a plurality of rhythm producing means each of which provides a different rhythmic pattern when activated, and means for activating with a predetermined probability said rhythm producing means, said last means including a random selection device, said random selection device comprising a plurality of switching devices each having on and off positions, a plurality of driving means for driving, respectively, said switching devices to on and off positions and for then leaving said switching devices randomly in either an on or off position, a switching circuit having an input lead and a plurality of output leads and comprising means for connecting said input lead to a selected one of said output leads as a function of the operation of the switching devices.

31. A music composing machine comprising means including random selection means and probability determining means for selecting a musical note with a predetermined probability that said note will follow a certain group of notes that preceded it, said apparatus further comprising means including said random selection means and probability determining means for next again selecting a musical note in accordance with a predetermined probability that said next selected note will follow a certain group of notes that preceded it, said last-mentioned group of notes including as the last note in the group the note that was previously selected, timing means for successively initiating the selection of a note, said composing machine including at least two different probability determining means each designed according to different probability tables, and means for operatively connecting one or another of said probability determining means into said composing machine as a function of the operation of said timing means.

32. A music composing machine comprising means including random selection means and a decode switch for selecting a musical note with a predetermined probability that said note will follow a certain group of notes that preceded it, said apparatus further comprising means including said random selection means and a decode switch for next again selecting a musical note in accordance with a predetermined probability that said next selected note will follow a certain group of notes that preceded it, said last-mentioned group of notes including as the last note in the group the note that was previously selected, a rhythm control unit for successively initiating the selection of a note, said composing machine including at least two decode switches each of which has a different probability wiring, and means for operatively connecting one or another of said decode switches into said composing machine as a function of the position in a measure of a note called for by said rhythm control unit.

33. A music composing machine comprising means including random selection means and a decode switch for selecting a musical note with a predetermined probability that said note will follow a certain group of notes that preceded it, said apparatus further comprising means including said random selection means and a decode switch for next again selecting a musical note in accordance with a predetermined probability that said next selected note will follow a certain group of notes that preceded it, said last-mentioned group of notes including as the last note in the group the note that was previously selected, a rhythm control unit for successively initiating the selection of a note, said composing machine including at least two decode switches each of which has a different probability wiring, and means for operatively connecting one or another of said decode switches into said composing machine as a function of the time value of a note called for by said rhythm control unit.

34. Switching apparatus comprising a plurality of X units and a Y unit which are located in a row corresponding to a switch position or switch setting, said apparatus further comprising a plurality of additional rows each comprising a plurality of X units and a Y unit whereby there are a plurality of switch positions or settings, each of said X units comprising a transducer that may be blocked so that it will not pass signal and unblocked so that it will pass signal, said X units being arranged in columns with each column including one X unit of each row, a plurality of input leads each of which is connected, respectively, to the input terminals of the X units in one of said columns, means for applying signal to a selected one of said leads whereby said signal is passed by an X unit providing it is unblocked, each of said Y units comprising a first vapor tube and a second vapor tube, the output circuit of the first vapor tube being coupled to the input circuit of the second vapor tube, means for holding the X units in any one row blocked when the second vapor tube of the Y unit in said one row is extinguished and means for holding said X units of said one row unblocked when said second vapor tube of said one row is fired, connections from the output circuits of certain X units in a certain row to the Y unit of a certain other row whereby signal is supplied to said last-mentioned Y unit provided said certain X units are in their unblocked condition at the time signal is impressed upon a certain input lead, means for firing the first vapor tube of any Y unit in response to signal being applied to the input circuit of the Y unit, means for next extinguishing in any Y unit the second vapor tube if it is in fired condition, means for next extinguishing in any Y unit the first vapor tube if it is in fired condition, said coupling between the first and second vapor tubes of a Y unit being such that the second vapor tube fires in response to the first vapor tube being extinguished, whereby the X units in said certain other row are unblocked.

35. Switching apparatus comprising a plurality of X units and a Y unit which are located in a row corresponding to a switch position or switch setting, said apparatus further comprising a plurality of additional rows each comprising a plurality of X units and a Y unit whereby there are a plurality of switch positions or settings, each of said X units comprising a transducer that may be blocked so that it will not pass signal and unblocked so that it will pass signal, said X units being arranged in columns with each column including one X unit of each row, a plurality of input leads each of which is connected, respectively, to the input terminals of the X units in one of said columns, means including a random switching device for applying signal to a selected one of said leads whereby said signal is passed by an X unit providing it is unblocked, each of said Y units comprising a first vapor tube and a second vapor tube, the output circuit of the first vapor tube being coupled to the input circuit of the second vapor tube, means for holding the X units in any one row blocked when the second vapor tube of the Y unit in said one row is extinguished and means for holding said X units of said one row unblocked when said second vapor tube of said one row is fired, connections from the output circuits of certain X units in a certain row to the Y unit of a certain other row whereby signal is supplied to said last-mentioned Y unit provided said certain X units are in their unblocked condition at the time signal is impressed upon a certain input lead, means for firing the first vapor tube of any Y unit in response to signal being applied to the input circuit of the Y unit, means for next extinguishing in any Y unit the second vapor tube if it is in fired condition, means for next extinguishing in any Y unit the first vapor tube if it is in fired condition, said coupling between the first and second vapor tubes of a Y unit being such that the second vapor tube fires in response to the first vapor tube being extinguished, whereby the X units in said certain other row are unblocked, and means for sounding or indicating a particular note in response to the firing and during the fired condition of the second vapor tube of a Y unit.

36. A relay switching circuit comprising a first and a second electric discharge tube, each of said tubes having a control electrode and having an input circuit and an output circuit, means for so coupling the output circuit of said first tube to the input circuit of said second tube that said second tube is blocked while said first tube is unblocked, and said second tube is unblocked when said first tube is blocked, means for blocking said first tube at will and thereby unblocking said second tube, said first tube when unblocked being in operating condition to pass signal, and said second tube when unblocked being in operating condition to pass signal, means for applying to the input circuits of said tubes a signal that is to be passed by one or the other of said tubes, an output lead connected to the output circuit of said first tube for supplying signal to an output terminal, and an output lead connected to the output circuit of said second tube for supplying signal to an output terminal whereby signal appears at one output terminal or the other depending upon which of said tubes is blocked.

37. Apparatus for choosing events successively in accordance with predetermined probabilities that certain events will follow a certain group of events which preceded them, which apparatus comprises a matrix having a plurality of groups of inputs, each of said groups including a plurality of said inputs, said matrix also having a plurality of outputs each corresponding to a different one of said groups of inputs, a plurality of circuit paths connecting said inputs in each of said groups of inputs to said outputs, said circuit paths being arranged in accordance with said predetermined probabilities, a random selection device for actuating at least one input in at least one of said plurality of groups of inputs at random, said random selection device also being operative to actuate one of said plurality of outputs connected to said selected input through one of said circuit paths, means for next actuating at least one of said inputs of the one of said groups of inputs corresponding to said actuated output, and a plurality of event selection means operable upon actuation of said outputs.

References Cited in the file of this patent

UNITED STATES PATENTS

| | | |
|---|---|---|
| 2,199,702 | Hammond | May 7, 1940 |
| 2,267,599 | Bradt | Dec. 23, 1941 |
| 2,308,778 | Prince | Jan. 19, 1943 |
| 2,461,456 | Usselman | Feb. 8, 1949 |
| 2,539,014 | Frantz | Jan. 23, 1951 |
| 2,541,051 | Hanert | Feb. 13, 1951 |
| 2,557,086 | Fisk et al. | June 19, 1951 |
| 2,570,716 | Rochester | Oct. 9, 1951 |
| 2,651,718 | Levy | Sept. 8, 1953 |
| 2,665,914 | Nicolaus | Jan. 12, 1954 |
| 2,672,068 | Hanert | Mar. 16, 1954 |
| 2,682,043 | Fitch | June 22, 1954 |
| 2,812,182 | Fiorino | Nov. 5, 1957 |